(12) United States Patent
Park

(10) Patent No.: US 8,506,151 B2
(45) Date of Patent: Aug. 13, 2013

(54) BACKLIGHT UNIT

(75) Inventor: Jun Seok Park, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 140 days.

(21) Appl. No.: 13/113,407

(22) Filed: May 23, 2011

(65) Prior Publication Data

US 2012/0057367 A1 Mar. 8, 2012

(30) Foreign Application Priority Data

Sep. 2, 2010 (KR) .................. 10-2010-0085906
Apr. 29, 2011 (KR) .................. 10-2011-0040811

(51) Int. Cl.
*F21V 7/04* (2006.01)

(52) U.S. Cl.
USPC ........................... 362/613; 362/621; 362/631

(58) Field of Classification Search
USPC ............... 362/612, 613, 634, 633, 621, 631
See application file for complete search history.

(56) References Cited

U.S. PATENT DOCUMENTS

| | | | | |
|---|---|---|---|---|
| 5,258,709 A | * | 11/1993 | Laukien ................... | 324/300 |
| 6,582,095 B1 | * | 6/2003 | Toyoda .................... | 362/235 |
| 6,669,350 B2 | * | 12/2003 | Yamashita et al. ........ | 362/612 |
| 7,204,634 B2 | * | 4/2007 | Chen et al. ............... | 362/616 |
| 7,368,338 B2 | * | 5/2008 | Yamazaki et al. ......... | 438/157 |
| 7,380,969 B2 | * | 6/2008 | Yamashita et al. ........ | 362/612 |
| 7,686,495 B2 | * | 3/2010 | Noba ....................... | 362/612 |
| 7,837,375 B2 | * | 11/2010 | Watanabe et al. ......... | 362/613 |
| 8,007,158 B2 | * | 8/2011 | Woo et al. ................ | 362/612 |
| 8,147,112 B2 | * | 4/2012 | Jung ........................ | 362/621 |
| 8,303,157 B2 | * | 11/2012 | Yang et al. ............... | 362/633 |
| 2007/0230215 A1 | * | 10/2007 | Chang ..................... | 362/613 |
| 2010/0217758 A1 | * | 8/2010 | Weissman et al. ......... | 707/713 |

FOREIGN PATENT DOCUMENTS

| | | |
|---|---|---|
| JP | 2003-279972 A | 10/2003 |
| JP | 4552095 B2 | 9/2010 |
| KR | 10-0782797 B1 | 11/2007 |
| KR | 10-2008-0005759 A | 1/2008 |
| KR | 10-2008-0052862 A | 6/2008 |
| KR | 10-2008-0054618 A | 6/2008 |

* cited by examiner

*Primary Examiner* — John A Ward
(74) *Attorney, Agent, or Firm* — Birch, Stewart, Kolasch & Birch, LLP

(57) ABSTRACT

Disclosed herein is a backlight unit including a light guide plate including a light emitting portion to emit light, side surfaces defining corners, and a first light incidence portion and a second light incidence portion to receive light, at least two light emitting modules respectively disposed to face the first light incidence portion and the second light incidence portion, and an optical sheet disposed on the light guide plate, wherein the first light incidence portion is disposed one corner region of the light guide plate, and the second light incidence portion is disposed another corner region of the light guide plate, wherein the first light incidence portion is facing the second light incidence portion or disposed to both sides of one side surface of the light guide plate.

18 Claims, 18 Drawing Sheets

BACKLIGHT UNIT

This application claims priority under 35 U.S.C. §119 to Korean Patent Application No. 10-2010-0085906, filed in Korea on 2 Sep. 2010 and 10-2011-0040811 in Korea on 29 Apr. 2011 which are hereby incorporated in its entirety by reference as if fully set forth herein.

TECHNICAL FIELD

The present disclosure relates to a backlight unit and a display apparatus using the same.

BACKGROUND

A liquid crystal display (LCD) device is well known. Since the LCD device is a light reception type device having no ability to emit light by itself, a separate light source unit is needed. Such a lighting apparatus used for the LCD device is called a "backlight unit".

Generally, backlight units are classified into an edge lighting type and a direct lighting type in accordance with the arrangement of light sources (for example, light emitting diodes (LEDs)).

In the edge lighting type, light sources (for example, LEDs) are arranged at a side surface of a light guide plate to guide light. This edge lighting type backlight unit is applied to relatively-small LCD devices such as monitors for desktop computers and notebooks. The edge lighting type exhibits excellent light uniformity and superior durability.

On the other hand, the direct lighting type is applied to middle/large display devices of 20 inches or more. In the direct lighting type backlight unit, light sources are arranged beneath a liquid crystal panel to directly illuminate the entire surface of the liquid crystal panel.

Generally, backlight units have a configuration including LEDs mounted on a bar-shaped circuit board, a light guide plate (LGP), a reflective sheet, and an optical sheet.

SUMMARY

One embodiment is a backlight unit. A light guide plate including a light emitting portion to emit light, side surfaces defining corners, and a first light incidence portion and a second light incidence portion to receive light; at least two light emitting modules respectively disposed to face the first light incidence portion and the second light incidence portion; and an optical sheet disposed on the light guide plate, wherein the first light incidence portion is disposed one corner region of the light guide plate, and the second light incidence portion is disposed another corner region of the light guide plate, wherein the first light incidence portion is facing the second light incidence portion or disposed to both sides of one side surface of the light guide plate.

The first light incidence portion and the second light incidence portion may be surfaces formed by cutting out at least two of the corners of the light guide plate, wherein the cut-out surfaces have a part of shape selected from a planar shape, a circular shape, an oval shape, and a polygonal shape.

The first light incidence portion and the second light incidence portion may be symmetrical in a diagonal direction of the light guide plate.

At least one of the light emitting modules may comprise a circuit board, and at least one of red, green, and/or blue light emitting device arranged on the circuit board.

The light emitting modules may include three or more light emitting modules, wherein at least one of the light emitting modules is arranged to face the side surfaces of the light guide plate arranged adjacent to a corresponding one of the first light incidence portion and the second light incidence portion.

At least one of the first light incidence portion and the second light incidence portion may have a roughness at a surface thereof.

In another embodiment, a backlight unit comprises a light guide plate including light incidence portions having a curved surface type or a polygonal surface type formed at least one side surface of the light guide plate; a light emitting module disposed to face the light incidence portion; and an optical sheet disposed on the light guide plate.

The light guide plate may comprise first to fourth surfaces; and the light incidence portion is disposed at least one of the first to fourth surfaces.

The light incidence portion may be respectively disposed two side surface of the light guide plate.

The light guide plate may include at least two light incidence portions at one of the first to fourth surfaces.

The light guide plate may include at least one light incidence portion at each of facing ones of the first to fourth surfaces.

The light incidence portions of the facing ones of the first to fourth surfaces may be aligned with each other in a symmetrical manner.

The light incidence portions of the facing ones of the first to fourth surfaces may be misaligned with each other.

A ratio of a length of the light incidence portions to an entire length of the surface of the light guide plate may be equal to or less than ⅓.

The light emitting modules may comprise a circuit board arranged to face an associated one of the light incidence portions, the circuit board having a shape corresponding to the associated light incidence portion; and light emitting elements disposed on the circuit board to face the associated light incidence portion.

The backlight unit may further comprise a bottom cover disposed at a back surface of the light guide plate, wherein the bottom cover has one or more portions having a shape corresponding to the light incidence portions at least one side surface of the bottom cover, and each of the light emitting modules is arranged between a corresponding one of the light incidence portions and the bottom cover.

The backlight unit may further comprise a bottom cover disposed at a back surface of the light guide plate; and one or more heat sinks disposed in the bottom cover to correspond to the light incidence portions, respectively, wherein each of the light emitting modules is arranged between a corresponding one of the light incidence portions and a corresponding one of the heat sink.

The circuit board may be a flexible printed circuit board.

In another embodiment, a backlight unit comprises a light guide plate including first to fourth side surfaces and a concave light incidence portion formed at least one of the side surfaces; a light emitting module disposed to face the light incidence portion, wherein the second and fourth side surfaces are disposed at both ends of the first side surface, wherein the light incidence portion has a shape substantially identical to a reduced scale of a virtual line drawn to extend from a corner, at which the first and second side surfaces meet, to a corner, at which the first and fourth surfaces meet, while contacting a virtual line.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
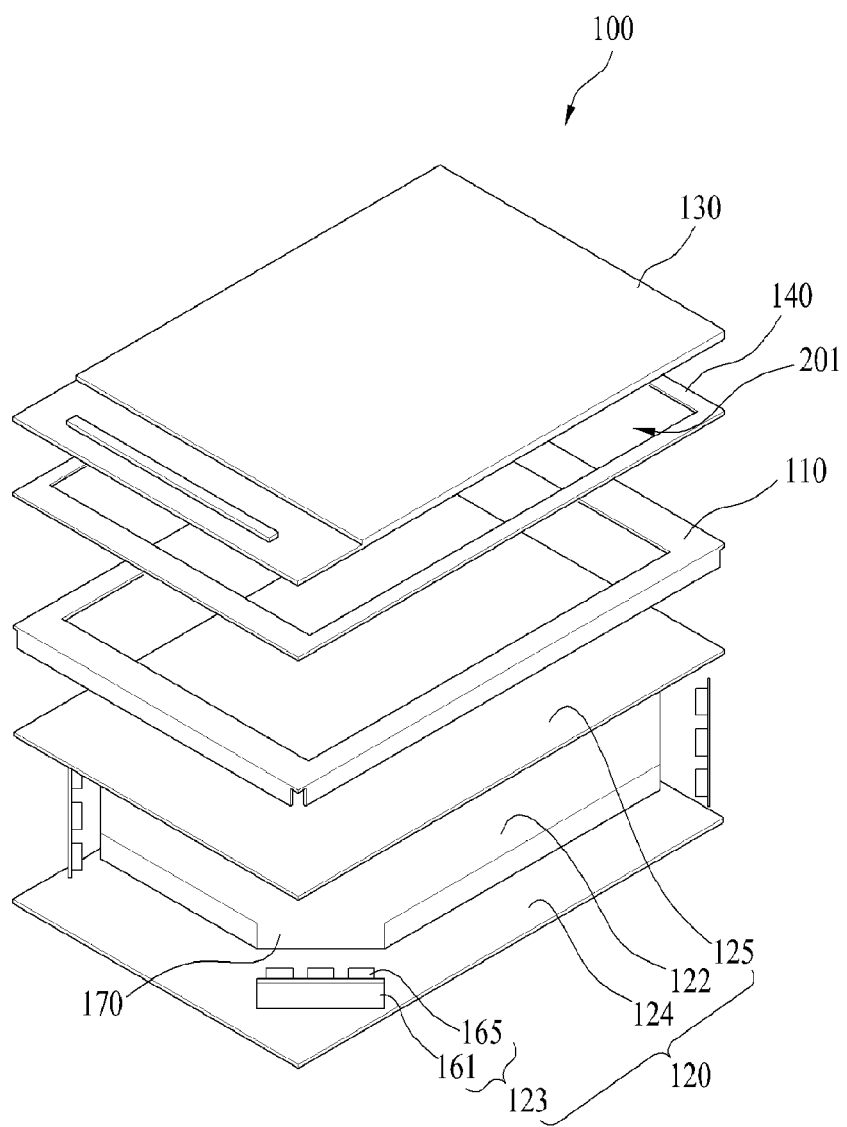
FIG. 1 is an exploded perspective view illustrating a display device 100 in accordance with an exemplary embodiment of the present disclosure as broadly described herein.

Reference will now be made in detail to the preferred embodiments of the present disclosure, examples of which are illustrated in the accompanying drawings. The present disclosure may be embodied in many alternate forms and should not be construed as being limited to the embodiments set forth herein. Accordingly, while the disclosure may be modified in various ways and be embodied in various forms, specific embodiments thereof are shown by way of example in the drawings and will herein be described in detail.

It should be understood, however, that there is no intent to limit the disclosure to the particular forms disclosed, but on the contrary, the disclosure is to cover all modifications, equivalents, and alternatives falling within the spirit and scope of the disclosure as defined by the claims. The same reference numbers will be used throughout the drawings to refer to the same or like parts. In the drawings, dimensions of layers are exaggerated, omitted or schematically illustrated for clarity and convenience of description. Further, when an element is referred to as being 'on' or "under" another element, it may be directly on/under the element, or one or more intervening elements may also be present. When an element is referred to as being 'on' or 'under', 'under the element' as well as 'on the element' may be included based on the element.

Hereinafter, an embodiment of the present disclosure will be described with reference to the accompanying drawings.

FIG. 1 is an exploded perspective view illustrating a display device 100 according to an exemplary embodiment of the present disclosure. Referring to FIG. 1, the display device 100 includes a top cover 110, a backlight unit 120, a liquid crystal display panel 130, and a light-shielding tape 140.

The top cover 110 receives and firmly holds the backlight unit 120 and liquid crystal display panel 130. The backlight unit 120 is disposed in the top cover 110. The backlight unit 120 generates light and emits the generated light toward the liquid crystal panel 130. The backlight unit 120 includes a light guide plate 122, light emitting modules 123, a reflective sheet 124, and an optical sheet 125.

The light guide plate 122 is disposed in the top cover 110 to guide light incident thereupon toward the liquid crystal display panel 130. The light guide plate 122 may have a plate structure having a uniform thickness. The light guide plate 122 may be made of a light-scattering light guide material exhibiting excellent light transmittance, heat resistance, chemical resistance, and mechanical strength.

For example, the light-scattering light guide material may include resin materials such as polymethylmethacrylate, polyamide, polyimide, polypropylene, and polyurethane. Each light guide plate 123 may be formed, at an upper or lower surface thereof, with a plurality of dots or V-shaped holes (not shown) to achieve uniform light reflection.

The light guide plate 122 may include a light emitting portion to emit light, side surfaces arranged perpendicular to the light emitting portion, and a light incidence portion 170 arranged perpendicular to the light emitting portion, and adapted to receive light. Adjacent ones of the side surfaces of the light guide plate 122 form corners. The light incidence portion 170 is a portion of the light guide plate 122 formed by cutting one of the corners of the light guide plate 122 such that the two adjacent side surfaces forming the corner meet the cut-out portion of the light guide plate 122 at an obtuse angle.

For example, the light guide plate 122 includes a light emitting portion and four side surfaces. Adjacent ones of the side surfaces form four corners. In this case, the light incidence portion 170 is a portion of the light guide plate 122 formed by cutting out one corner of the light guide plate 122 such that the two adjacent side surfaces forming the corner meet the cut-out portion of the light guide plate 122 at an obtuse angle. The light guide plate 122 may include four corner regions each including one corner and portions of the adjacent side surfaces forming the corner. In this case, the light incidence portion 170 may be a cut-out surface formed by cutting out at least one of the four corner regions.

Although four light incidence portions 170 are provided by cutting out fourth corners in the case of FIG. 1, the present disclosure is not limited thereto.

Figure 2:
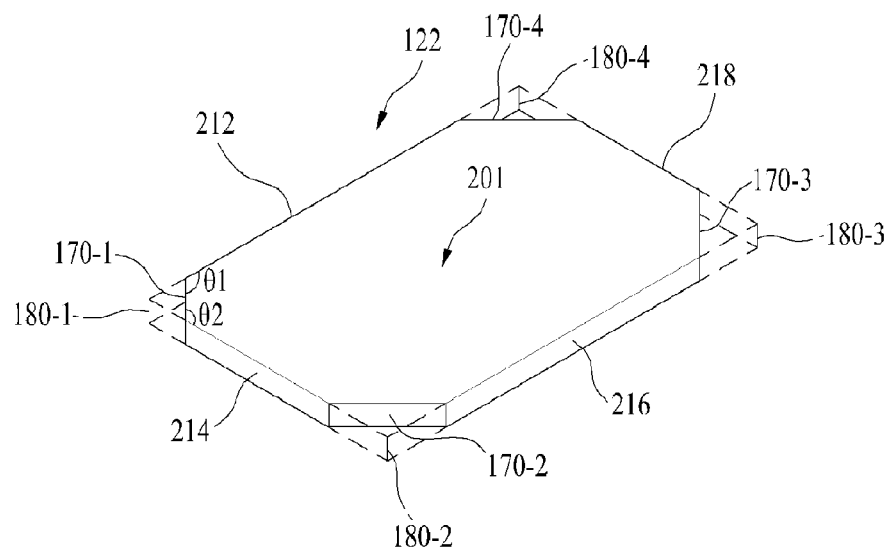
FIG. 2 is a perspective view schematically illustrating a light guide plate shown in FIG. 1.

FIG. 2 illustrates the light guide plate 122 shown in FIG. 1. Referring to FIG. 2, the light guide plate 122 includes a light emitting portion 201 to emit light, an opposing portion (not shown) arranged opposite to the light emitting portion 201, four side surfaces 212, 214, 216, and 128 to connect the light emitting portion 201 and the opposing portion, and fourth light incidence portions 170-1 to 170-4.

The light incidence portions 170-1 to 170-4 are respective cut-out surfaces formed by cutting out four corners 180-1 to 180-4 at which adjacent ones of the side surfaces 212, 214, 216, and 218 are joined. The angle defined between each of the light incidence portions 170-1 to 170-4 and each of the adjacent side surfaces meeting the light incidence portion is an obtuse angle ($90°<\theta 1, \theta 2<180°$). The opposing portion is a surface opposite to the light emitting portion 201. This opposing portion is not shown in FIG. 2. For example, the angles $\theta 1$ and $\theta 2$ defined between each light incidence portion (for example, 170-1) and respective side surfaces meeting the first light incidence portion while being adjacent to each other (for example, 212 and 214) is greater than 90°, but less than 180°. The angle between each first light incidence portion (for example, 170-1) and one of the side surfaces disposed adjacent to the first light incidence portion (for example, 212), for example, the angle $\theta 1$, may be equal to the angle between the first light incidence portion and the other of the side surfaces disposed adjacent to the first light incidence portion (for example, 214), for example, the angle $\theta 2$, although the present disclosure is not limited thereto. The angles $\theta 1$ and $\theta 2$ may be different.

Although the light guide plate 122 has the four light incidence portions 170-1, 170-2, 170-3, and 170-4 in the case of FIG. 2, the present disclosure is not limited thereto. Of course, when the light guide plate 122 has the four light incidence portions 170-1, 170-2, 170-3, and 170-4 respectively arranged at the four corner regions, it may be possible to achieve uniform light incidence to the light guide plate 122.

The light emitting modules 123 are disposed in the top cover 110 to irradiate light to the light incidence portions 170-1, 170-2, 170-3, and 170-4 of the light guide plate 122, respectively. The light emitting modules 123 are arranged to face respective light incidence portions 170-1, 170-2, 170-3, and 170-4.

Each light emitting module 123 includes a circuit board 161 and light sources 165. The light sources 165 may be light emitting diodes. Although the light sources will be hereinafter referred to as "light emitting diodes 165", the present disclosure is not limited thereto. The circuit boards 161 of the light emitting modules 123 are arranged to correspond to respective light incidence portions 170-1, 170-2, 170-3, and 170-4, and may be metal printed circuit boards, although the present disclosure is not limited thereto.

The light emitting diodes 165 of each light emitting module 123 may be mounted on the corresponding circuit board 161 to face a corresponding one of the light incidence portions 170-1, 170-2, 170-3, and 170-4. The light emitting modules 123 corresponding to respective light incidence portions 170-1, 170-2, 170-3, and 170-4 may be arranged to be spaced part from one another.

The light emitting diodes 165 disposed on each circuit board 161 may be white light emitting diodes to emit white light. A combination of red, green, and blue light emitting diodes may be arranged on each circuit board 161. For example, red, green, and blue light emitting diodes may be alternately and repeatedly arranged on each circuit board 161 while facing each of the light incidence portions 170-1, 170-2, 170-3, and 170-4.

Each circuit board 161 may be a copper clad laminate. In this case, the copper clad laminate may include a substrate on which elements are mounted, and wirings to connect the elements. The substrate material of the circuit board 161 may be a resin such as epoxy, phenol, or polyimide. A reinforcing material may be added to the substrate material in order to increase the strength of the circuit board 161.

Figure 3:
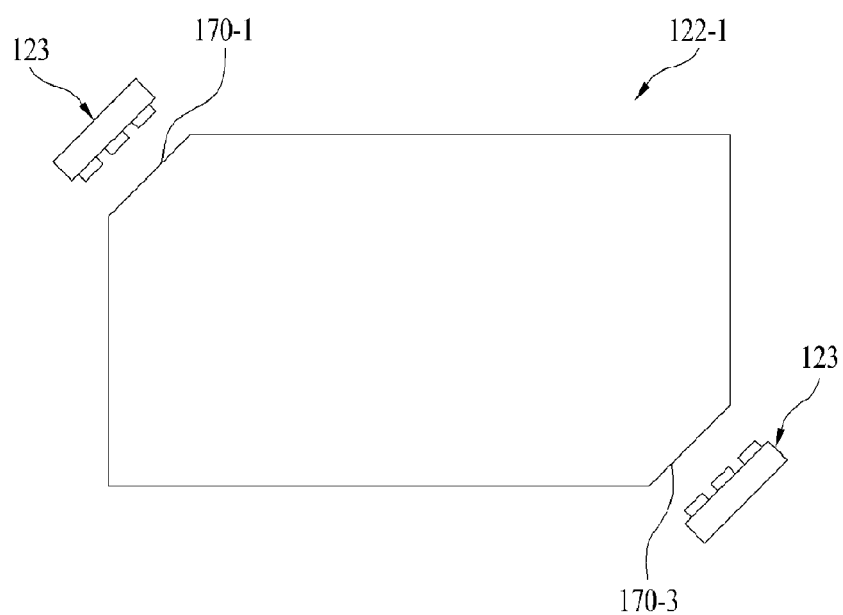
FIG. 3 is a plan view illustrating light incidence portions of a light guide plate and light emitting modules according to an exemplary embodiment of the present disclosure.

FIG. 3 illustrates light incidence portions of the light guide plate 122 and light emitting modules 123 according to an exemplary embodiment of the present disclosure. Referring to FIG. 3, the light guide plate 122 includes light incidence portions (for example, 170-1 and 170-3) arranged at facing corner regions of the light guide plate 122. Light emitting modules 123 may be arranged at the light incidence portions (for example, 170-1 and 170-3) to face the light incidence portions while being spaced apart from the light incidence portions, respectively. For example, the light guide plate 122 may include two light incidence portions 170-1 and 170-3 arranged to be symmetrical in a diagonal direction.

Figure 4:
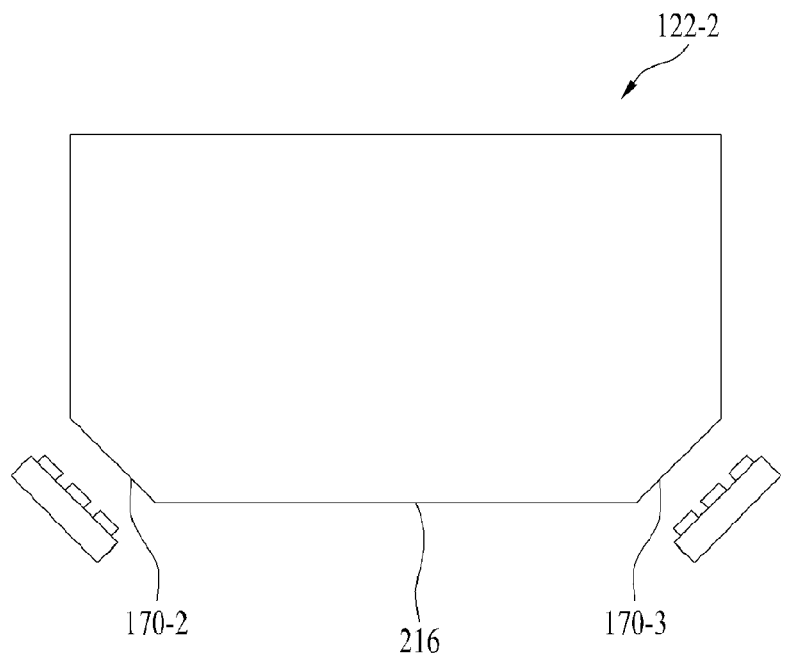
FIG. 4 is a plan view illustrating light incidence portions of a light guide plate and light emitting modules according to another embodiment of the present disclosure.

FIG. 4 illustrates light incidence portions of the light guide plate 122 and light emitting modules according to another embodiment of the present disclosure. Referring to FIG. 4, the light guide plate 122 includes light incidence portions (for example, 170-2 and 170-3) respectively arranged at corner regions disposed at both sides of one side surface (for example, 216) of the light guide plate 122 while being adjacent to the side surface. Light emitting modules 123 are arranged to face the light incidence portions (for example, 170-2 and 170-3) while being spaced apart from the light incidence portions, respectively. That is, the light guide plate 122 may include light incidence portions (for example, 170-2 and 170-3) formed by cutting out corners respectively arranged adjacent to the both sides of one side surface (for example 216) of the light guide plate 122.

For example, the light guide plate 122 may include two light incidence portions 170-2 and 170-3 arranged to be symmetrical in a lateral direction.

As shown in FIGS. 2 to 4, the light guide plate 122 may be provided with light incidence portions 170 respectively arranged near at least one corner regions. At least one light emitting modules 123 are arranged to face the light incidence portions 170, respectively.

The illustrated embodiments have a structural feature in that one or more light incidence portions 170 are arranged near one or more corner regions of the light guide plate 122, respectively. In particular, it may be possible to achieve uniform incidence of light to the light guide plate 122 because light incidence portions 170 may be provided at all four corner regions of the light guide plate 122, respectively. In addition, it may be possible to reduce the number of light sources because light emitting modules 123 are arranged to face the light incidence portions 170 provided at the corner regions, respectively, as compared to the case in which light emitting modules are arranged to face respective side surfaces of the light guide plate. Also, it may be possible to enhance the brightness of the backlight unit 100 as light is irradiated to two or more light incidence portions (for example, 170-1 to 170-4) in the illustrated embodiments).

The reflective sheet 124 is disposed at a back surface (or a lower surface) of the light guide plate 122. The reflective sheet 124 reflects light emitted from the back surface of the light guide plate 122 so as to cause the light to be again incident upon the light guide plate 122. The reflective sheet 124 may be bonded to the back surface of the light guide plate 122 by a double-sided tape.

The reflective sheet 124 may be made of a resin material such as polymethylmethacrylate (PMMA), polycarbonate (PC) or polyethylene terephthalate (PET).

The optical sheet 125 is disposed on a front surface (or an upper surface) of the light guide plate 122 so as to enhance the characteristics of light passing therethrough. The optical sheet 125 may allow the light guided by the light guide plate 123 to be uniformly irradiated toward the liquid crystal display panel 130. The optical sheet 125 may include a diffusion sheet to diffuse light received from the light guide plate 123, and a prism sheet to vary the emission direction of light received from the diffusion sheet such that the light is emitted from the optical sheet 125 in a direction perpendicular to the optical sheet 125. The optical sheet 125 may include a combination of two or three diffusion and prism sheets.

The optical sheet 125 may further include a protective sheet disposed on the diffusion sheet or prism sheet. The protective sheet protects the diffusion and prism sheets susceptible to dust or scratches, and prevents the diffusion and prism sheets from moving during transportation of the backlight unit. The optical sheet 125 may be made of a transparent resin such as an acryl resin, a polyurethane resin, or a silicon resin.

The liquid crystal display panel 130 is disposed in front of the optical sheet 125. The liquid crystal display panel 130 includes glass substrates, a liquid crystal layer interposed between the glass substrates, and polarizing plates arranged on the glass substrates to utilize polarizing properties of light. Here, the liquid crystal layer has properties between a liquid and a solid. That is, in the liquid crystal layer, liquid crystals which are organic molecules having fluidity like a liquid are regularly oriented, and the liquid crystal layer displays an image using change of such molecular orientation due to an external electric field. A color filter (not shown) may be arranged at a front surface of the liquid crystal display panel 130.

The light-shielding tape may include a double-sided black tape. The light-shielding tape is attached between the liquid crystal display panel 130 and the top cover 110 so as to shield light leaking into a region other than a light emitting region 101.

Figure 5:
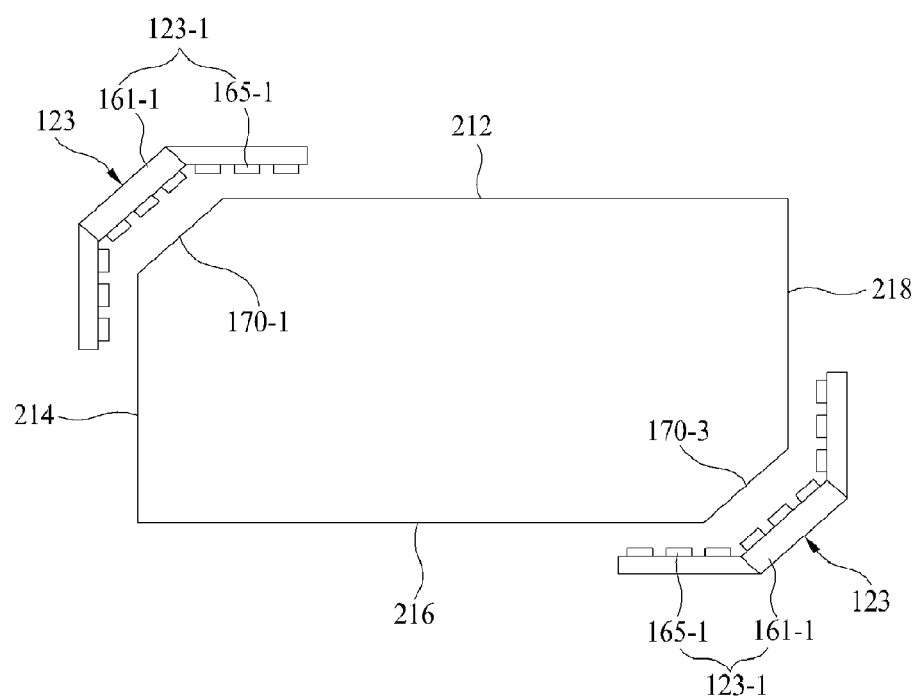
FIG. 5 is a plan view illustrating an arrangement of light emitting modules according to another embodiment of the present disclosure.

FIG. 5 illustrates an arrangement of light emitting modules according to another embodiment of the present disclosure. Referring to FIG. 5, a light emitting module 123-1 may be arranged to face a region including portions of side surfaces (for example, 212 and 214) of the light guide plate 122 arranged adjacent to each light incidence portion (for example, 170-1).

For example, each light emitting module 123-1 may include a circuit board 161-1 and light emitting diodes 165. The circuit board 161-1 may have a curved structure so that it may face the portions of the side surfaces (for example, 212 and 214) of the light guide plate 122 arranged adjacent to the corresponding light incidence portion (for example, 170-1). The light emitting diodes 165 may be disposed on the curved circuit board 161-1.

Figure 6:
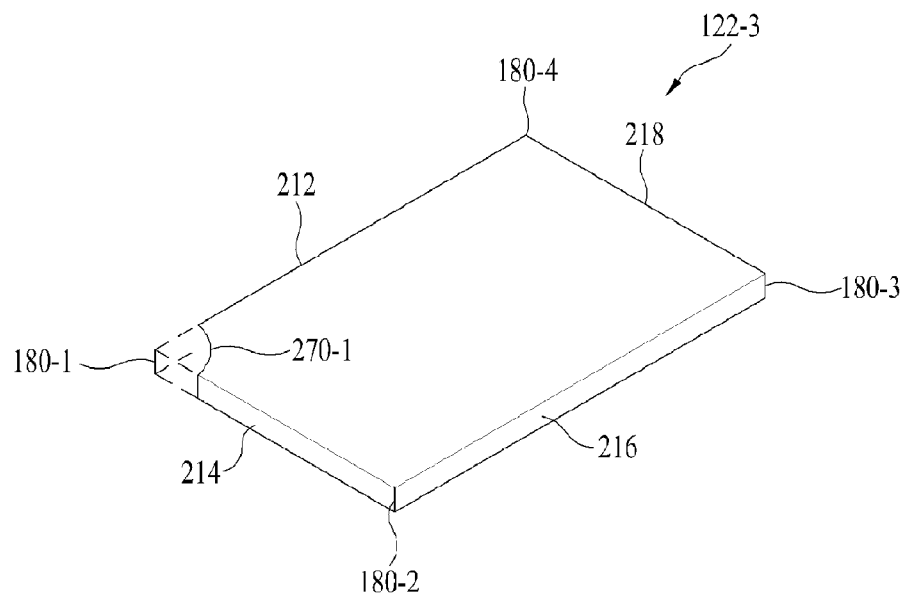
FIG. 6 is a perspective view schematically illustrating a light guide plate according to another embodiment of the present disclosure.
Figure 9:
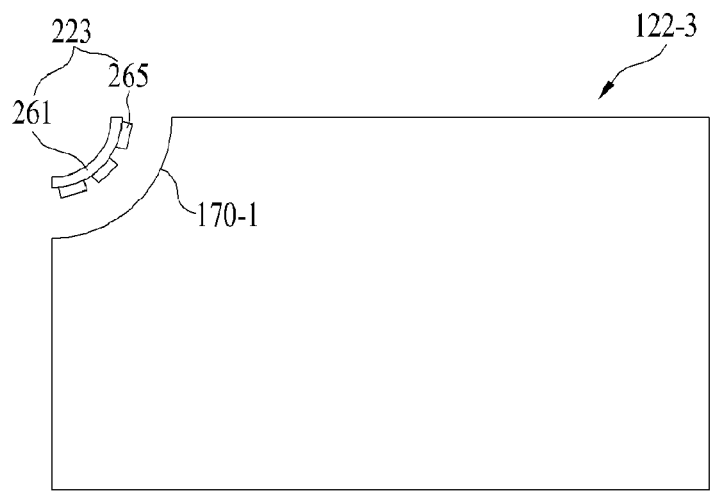
FIG. 9 is a plan view illustrating a light emitting module arranged to face a light incidence portion of the light guide plate shown in FIG. 6.

FIG. 6 illustrates a light guide plate 122-3 according to another embodiment of the present disclosure. FIG. 9 illustrates a light emitting module arranged to face a light incidence portion 270-1 of the light guide plate 122-3 shown in FIG. 6.

Referring to FIGS. 6 and 9, the light guide plate 122-3 includes one light incidence portion 270-1, which is a cut-out surface formed by cutting one corner 180-1 of the light guide plate 122-3. The light incidence portion 270-1 may have a curved surface.

A light emitting module 223 may be arranged to face the light incidence portion 270-1. The light emitting module 223 may include a circuit board 261 and light emitting diodes 265.

The circuit board 261 may have a curved structure so that it has a curved portion corresponding to the light incidence portion 270-1. For example, the circuit board 261 may have a curved surface having the same curvature as the light incidence portion 270-1. The light emitting diodes 265 may be disposed on the curved surface of the circuit board 261 to face the light incidence portion 270-1. The circuit board 261 may be a flexible printed circuit board.

Figure 7:
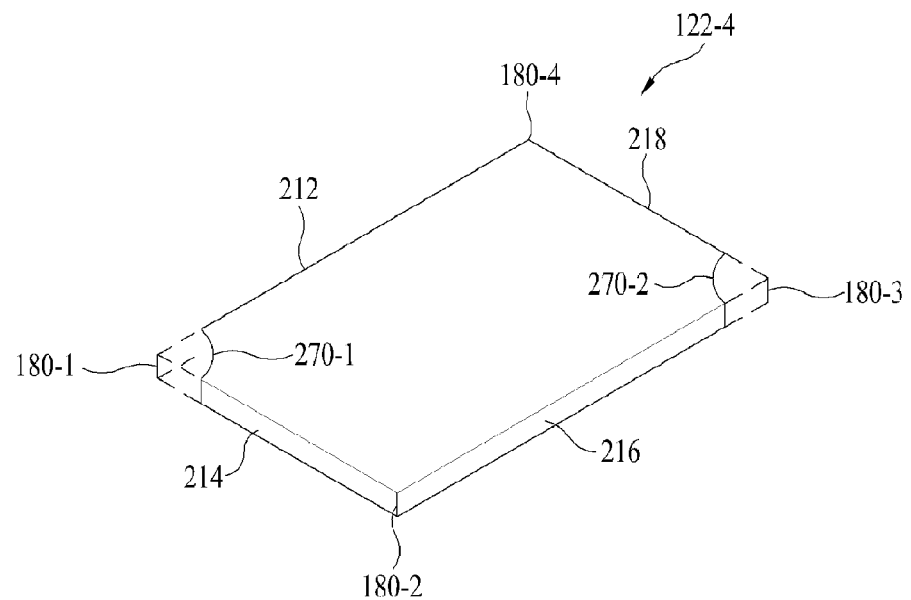
FIG. 7 is a perspective view schematically illustrating a light guide plate according to another embodiment of the present disclosure.
Figure 10:
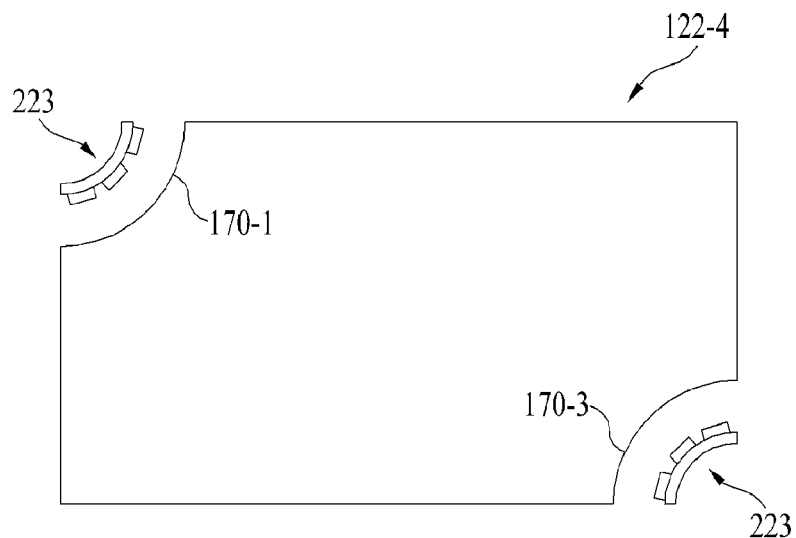
FIG. 10 is a plan view illustrating light emitting modules arranged to face light incidence portions of the light guide plate shown in FIG. 7.

FIG. 7 illustrates a light guide plate 122-4 according to another embodiment of the present disclosure. FIG. 10 illustrates light emitting modules arranged to face respective light incidence portions 270-1 and 270-3 of the light guide plate 122-4 shown in FIG. 7.

Referring to FIGS. 7 and 10, the light guide plate 122-4 includes two light incidence portions 270-1 and 270-3, which are cut-out surfaces formed by cutting out two corners 180-1 and 180-3 of the light guide plate 122-4 facing each other in a diagonal direction. The light incidence portions 270-1 and 270-3 may have curved surfaces, respectively. The light incidence portions 270-1 and 270-3 may be symmetrical in a diagonal direction. Light emitting modules 223 may be arranged to face the light incidence portions 270-1 and 270-3, respectively.

Figure 8:
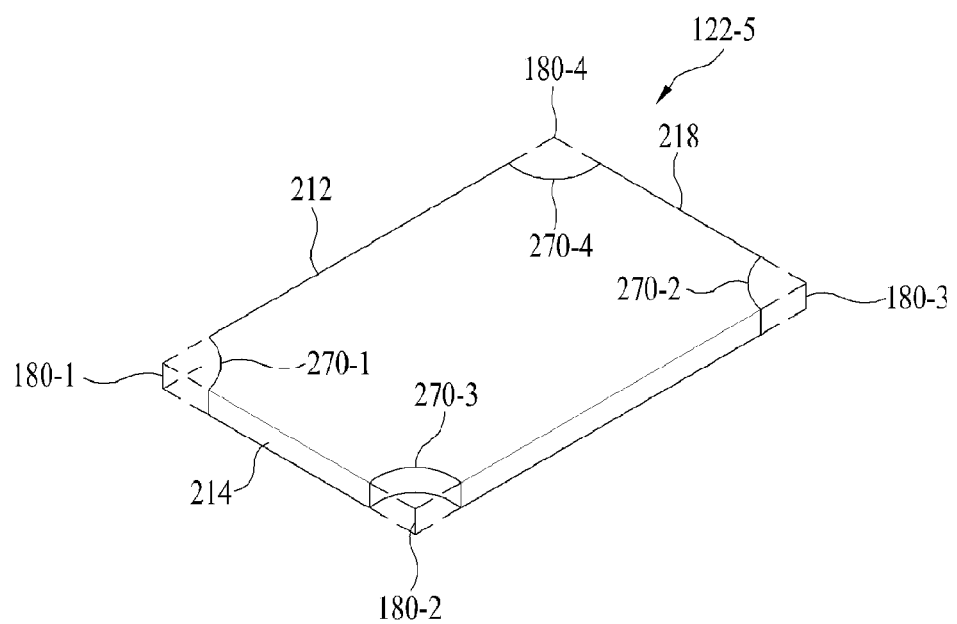
FIG. 8 is a perspective view schematically illustrating a light guide plate according to another embodiment of the present disclosure.
Figure 11:
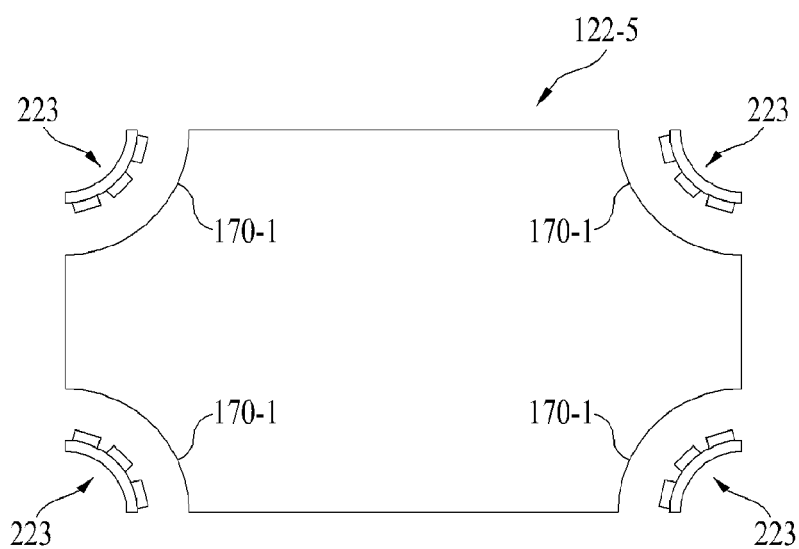
FIG. 11 is a plan view illustrating light emitting modules arranged to face light incidence portions of the light guide plate shown in FIG. 8.

FIG. 8 illustrates a light guide plate 122-5 according to another embodiment of the present disclosure. FIG. 11 illustrates light emitting modules arranged to face respective light incidence portions 270-1 to 270-4 of the light guide plate 122-5 shown in FIG. 8.

Referring to FIGS. 8 and 11, the light guide plate 122-5 includes four light incidence portions 270-1 to 270-4, which are cut-out surfaces formed by cutting out four corners 180-1 to 180-4 of the light guide plate 122-5. The light incidence portions 270-1 to 270-4 may have curved surfaces, respectively. Light emitting modules 223 may be arranged to face the light incidence portions 270-1 to 270-4, respectively.

Figure 12:
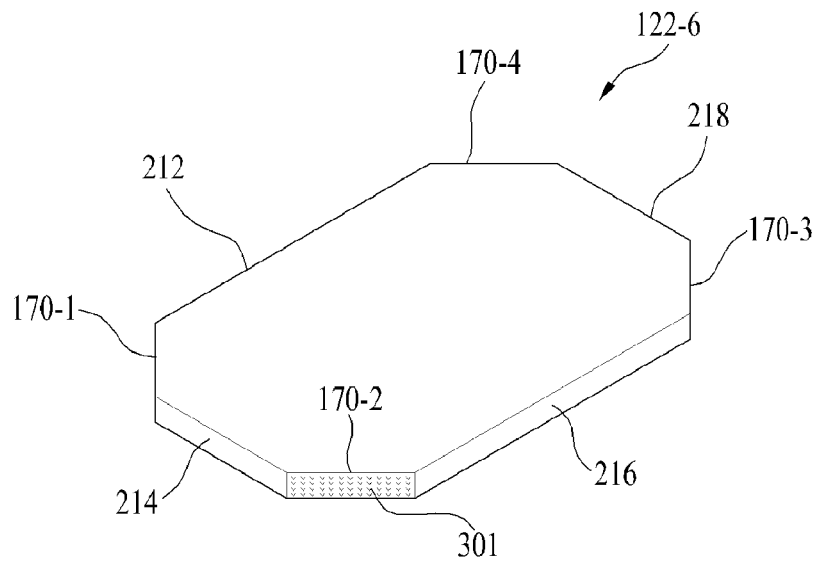
FIG. 12 is a perspective view illustrating a light guide plate according to another embodiment of the present disclosure.

FIG. 12 illustrates a light guide plate 122-6 according to another embodiment of the present disclosure. The light guide plate 122-6 may have the same structure as the light guide plate 122 shown in FIG. 1. In this case, a roughness 301 may be provided at each of the light incidence portions 170-1 to 170-4 of the light guide plate 122-6. For example, the roughness 301 may be regular or irregular grooves and protrusions. Also the roughness 301 may be provided at the light incidence portions 270-1 to 270-4 shown in FIG. 6 to FIG. 7. The roughness 301 functions to uniformly diffuse light incident upon the corresponding light incidence portion from the corresponding light emitting module. Accordingly, it may be possible to prevent formation of dark areas at side surface regions of the light guide plate 122 adjacent to the light incidence portions 170-1 to 170-4.

Figure 13:
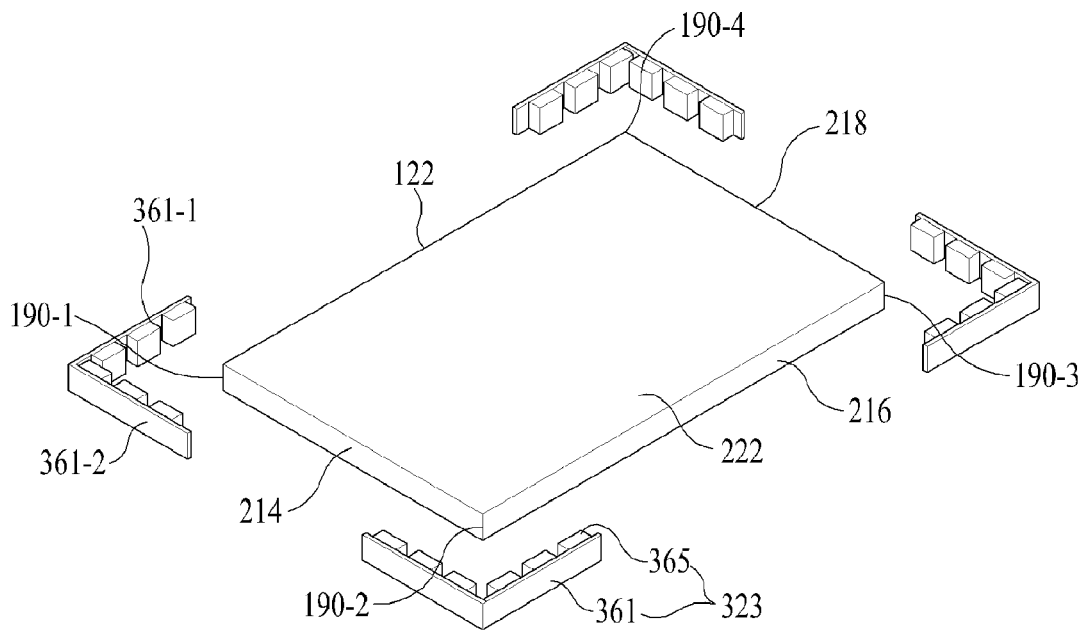
FIG. 13 is a perspective view illustrating a light guide plate and an arrangement of light emitting modules according to another embodiment of the present disclosure.

FIG. 13 illustrates a light guide plate 222 and an arrangement of light emitting modules 323 according to another embodiment of the present disclosure. In FIG. 13, the same reference numerals as those of FIG. 1 designate the same constituent elements as those of FIG. 1. Overlapping content will be omitted or more briefly described.

Referring to FIG. 13, the light guide plate 222 does not have a cut-out corner portion, different from the light guide plate 122 of FIG. 1. Light emitting modules 323 are arranged adjacent to at least one of corners of the light guide plate 222, respectively. For example, one or more light emitting modules 323 are arranged to face portions of side surfaces of the light guide plate 122 adjacent to one or more corners of the light guide plate 122, respectively. Each light emitting module 323 may include a circuit board 361 and light emitting diodes 365. The circuit board 361 may have a curved structure so that it may face two side surfaces of the light guide plate 122 arranged adjacent to the corresponding corner of the light guide plate 122. For example, the circuit board 361 may have a first portion 361-1 facing a first side surface (for example, 212) adjacent to the corresponding corner (for example, 190-1) and a second portion 361-2 facing a second side surface (for example, 214) adjacent to the corresponding corner (for example, 190-1). The angle between the first and second portions 361-1 and 361-2 may be greater than 0°, but less than or equal to 90°. The light emitting diodes 365 may be disposed on the first portion 361-1 to face the first side surface 212 while being disposed on the second portion 361-2 to face the second side surface 214.

Although light emitting modules 323 are arranged at four corners 190-1 to 190-4 of the light guide plate 222 in the embodiment of FIG. 13, the present disclosure is not limited thereto.

Figure 14:
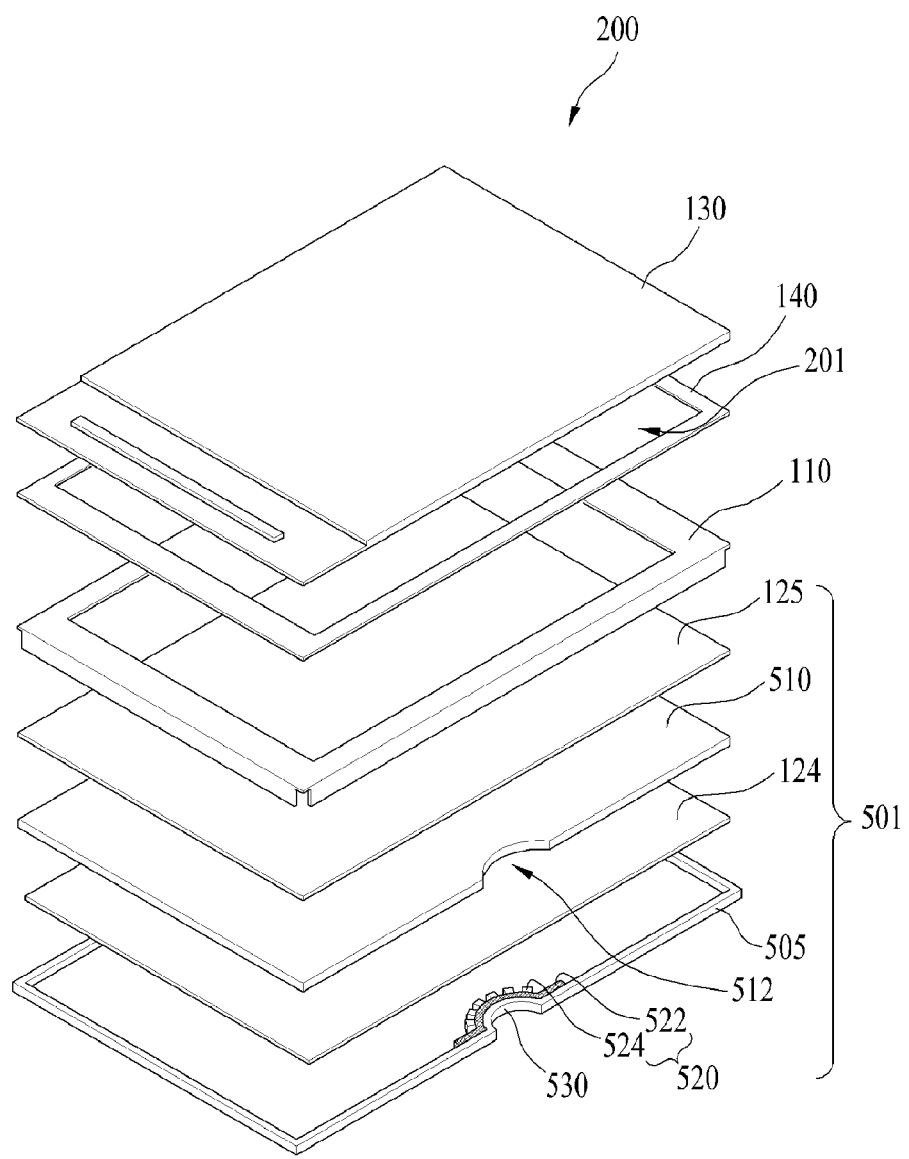
FIG. 14 is an exploded perspective view illustrating a display device according to another embodiment of the present disclosure.

FIG. 14 is an exploded perspective view illustrating a display device 200 according to another embodiment of the present disclosure. In FIG. 14, the same constituent elements as those of FIG. 1 will be designated by the same reference numerals, respectively. No description will be given as to the same constituent elements in order to avoid repeated description.

Referring to FIG. 14, the display device 200 includes a top cover 110, a backlight unit 501, a liquid crystal display panel 130, and a light-shielding tape 140.

The backlight unit 501 includes a bottom cover 505, a light guide plate 510, a light emitting module 520, an optical sheet 125, and a reflective sheet 124. The backlight unit 501 is disposed inside the top cover 110 and bottom cover 505. The backlight unit 501 generates light and emits the generated light toward the liquid crystal display panel 130.

The light guide plate 510 is disposed in front of or above the bottom cover 505. The light guide plate 510 has inwardly-rounded light incidence portions 512 respectively formed at one or more side surfaces thereof. For example, the light guide plate 510 may have four side surfaces and light incidence portions 530 respectively formed at one or more of the side surfaces. Each light incidence portion 510 may have a portion formed with a concave surface. The rest portion of the side surfaces except light incident portion 530 may be flat.

Figure 15:
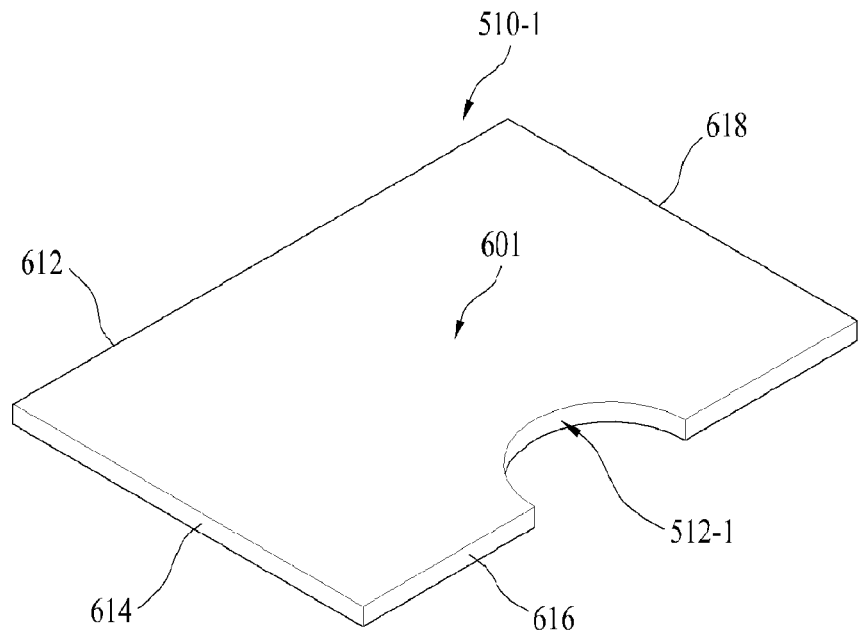
FIG. 15 is a perspective view illustrating an exemplary embodiment of a light guide plate included in the display device shown in FIG. 14.

FIG. 15 illustrates an exemplary embodiment of the light guide plate included in the display device shown in FIG. 14.

Referring to FIG. 15, the light guide plate, which is designated by reference numeral 510-1, includes a light emitting portion 601 to emit light, an opposing portion (not shown) arranged opposite to the light emitting portion 601, and four side surfaces 612, 614, 616, and 618 connecting the light emitting portion 601 and the opposing portion. The third side surface 616 of the light guide plate 510-1 has a portion formed with a curved surface concave in a first direction. The concave curved surface functions as the light incidence portion 512 ("512-1" in the case of FIG. 15) upon which light from the light emitting module 520 is incident. Here, the first direction may be a direction from the third side surface 616 to the first side surface 612.

Figure 16:
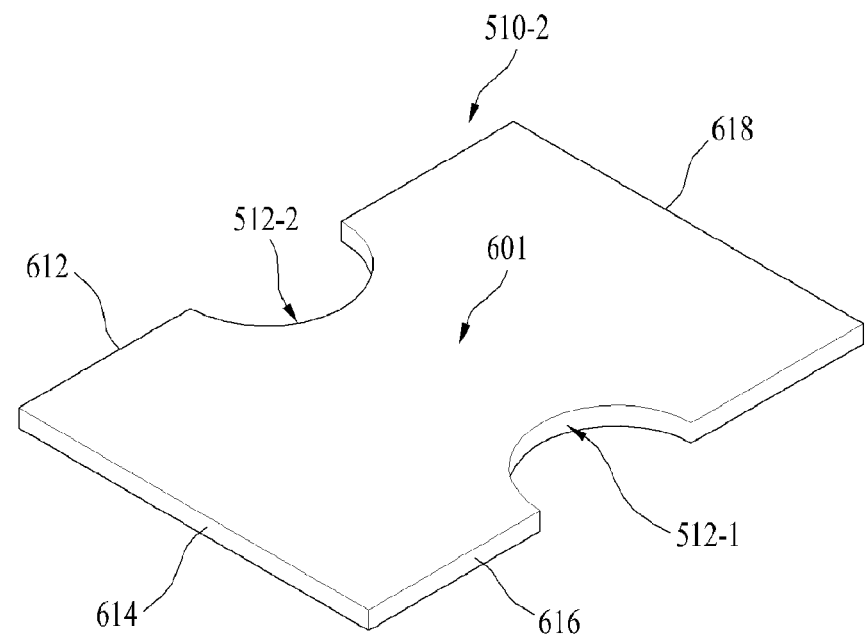
FIG. 16 is a perspective view illustrating another embodiment of the light guide plate included in the display device shown in FIG. 14.

FIG. 16 illustrates another embodiment of the light guide plate included in the display device shown in FIG. 14.

Referring to FIG. 16, the light guide plate, which is designated by reference numeral 510-2, includes a light emitting portion 601 and four side surfaces 612, 614, 616, and 618. The light guide plate 510-2 includes light incidence portions 512-1 and 512-2, which are concave curved surfaces formed at portions of the two facing side surfaces 616 and 612, respectively.

The first and second light incidence portions 512-1 and 512-2 respectively provided at the facing side surfaces 616 and 612 may be aligned to face each other. For example, the first light incidence portion 512-1 may be provided at a central portion of the third side surface 616 of the light guide plate 510-2, and the second light incidence portion 512-2 may be provided at a central portion of the first side surface 612 of the light guide plate 510-2.

As the light incidence portions (for example, 512-1 and 512-2) are arranged at the central portions of the side surfaces (for example, 616 and 612), respectively, it may be possible to allow light emitted from light emitting modules 520 to be uniformly incident upon the light guide plate 510.

Figure 17:
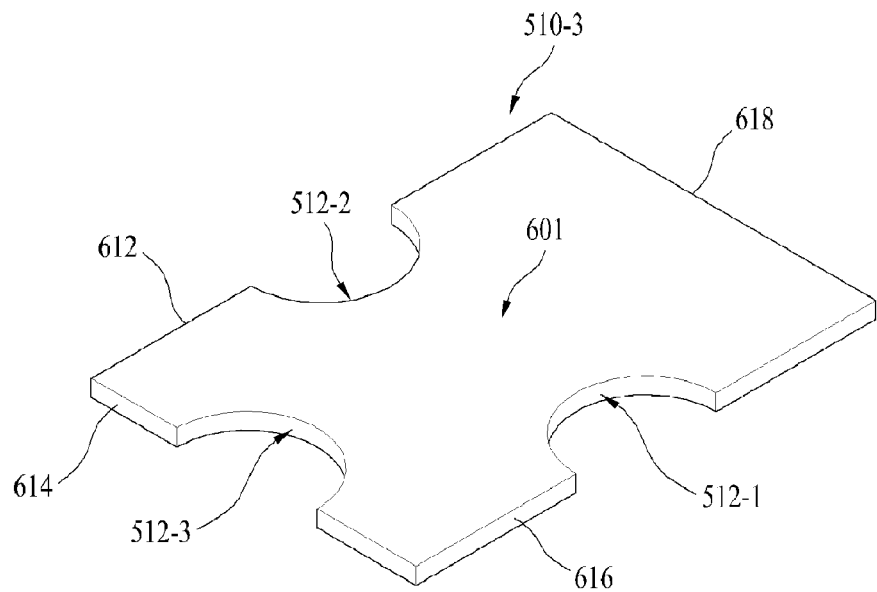
FIG. 17 is a perspective view illustrating another embodiment of the light guide plate included in the display device shown in FIG. 14.

FIG. 17 illustrates another embodiment of the light guide plate included in the display device shown in FIG. 14.

Referring to FIG. 17, the light guide plate, which is designated by reference numeral 510-3, may include four side surfaces 612, 614, 616, and 618, and light incidence portions 512-1, 512-2, and 512-3, which are concave curved surfaces formed at portions of the three side surfaces 616, 612, and 614, respectively.

Figure 18:
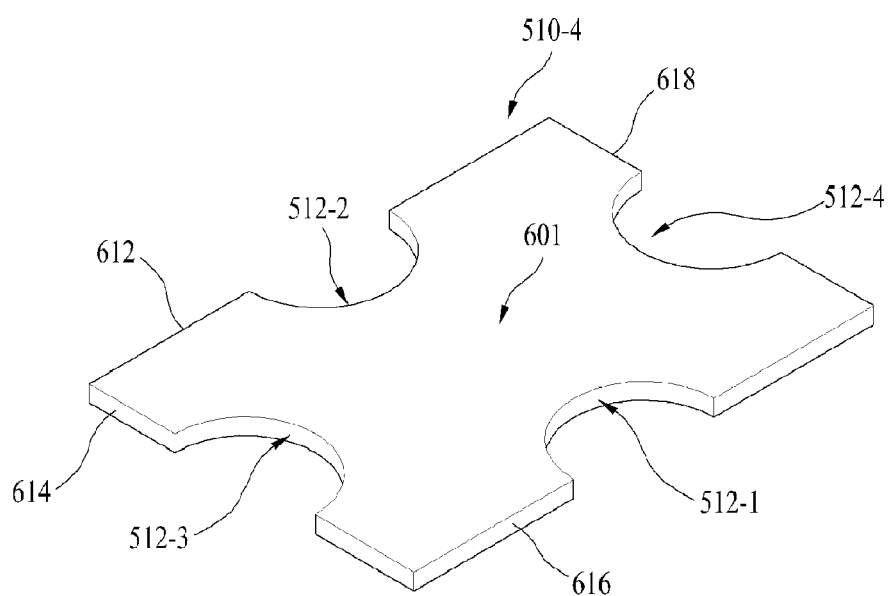
FIG. 18 is a perspective view illustrating another embodiment of the light guide plate included in the display device shown in FIG. 14.

FIG. 18 illustrates another embodiment of the light guide plate included in the display device shown in FIG. 14.

Referring to FIG. 18, the light guide plate, which is designated by reference numeral 510-4, may include four side surfaces 612, 614, 616, and 618, and light incidence portions 512-1 to 512-4, which are concave curved surfaces formed at portions of the four side surfaces 616, 612, 614, and 618, respectively.

Figure 19:
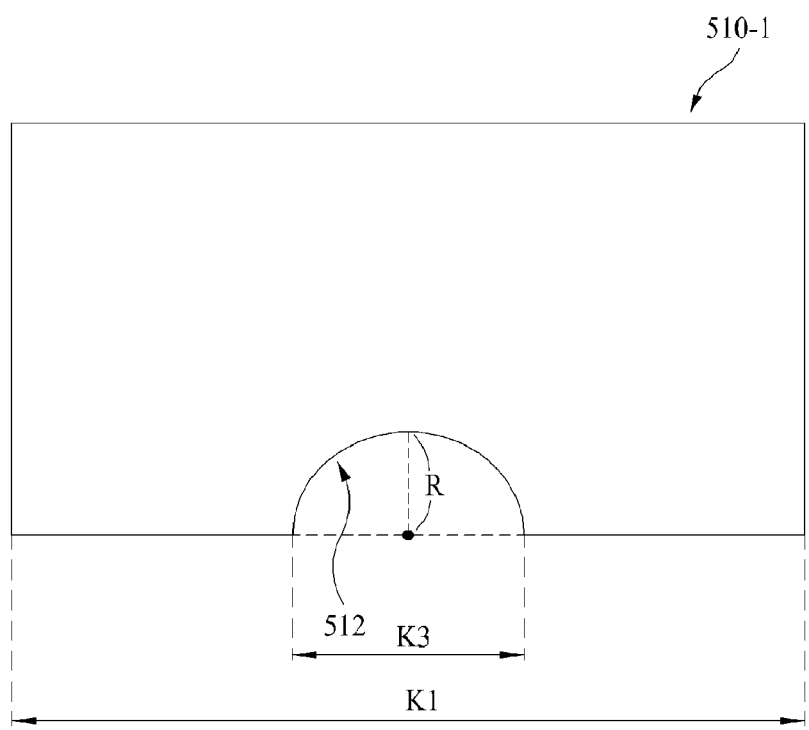
FIG. 19 is a plan view schematically illustrating an exemplary embodiment of a light incidence portion included in the light guide plate shown in FIG. 14.

FIG. 19 illustrates an exemplary embodiment of the light incidence portion 512 included in the light guide plate 510-1 shown in FIG. 14. Referring to FIG. 19, the light incidence portion 512 may have a semicircular shape having a radius of "R".

Figure 20:
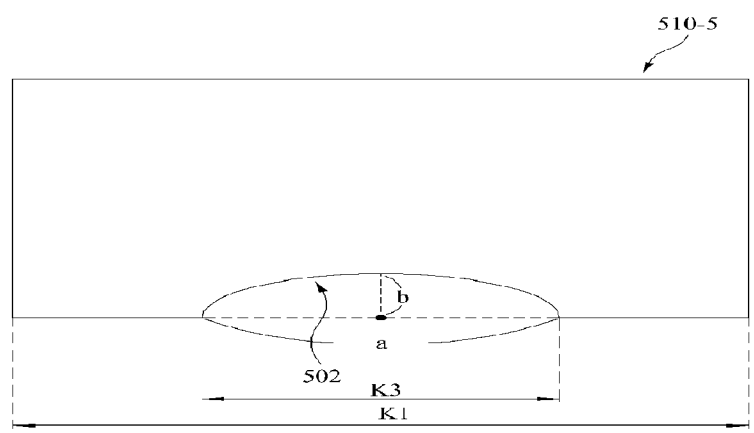
FIG. 20 is a plan view schematically illustrating a light guide plate with a light incidence portion according to another embodiment.

FIG. 20 illustrates a light guide plate 510-5 including a light incidence portion 502 according to another embodiment of the present disclosure. Referring to FIG. 20, the light incidence portion 502 may have an oval shape. For example, the light incidence portion 502 may have an oval shape having a longer-axis length of "a" and a shorter-axis length of "b".

Figure 21:
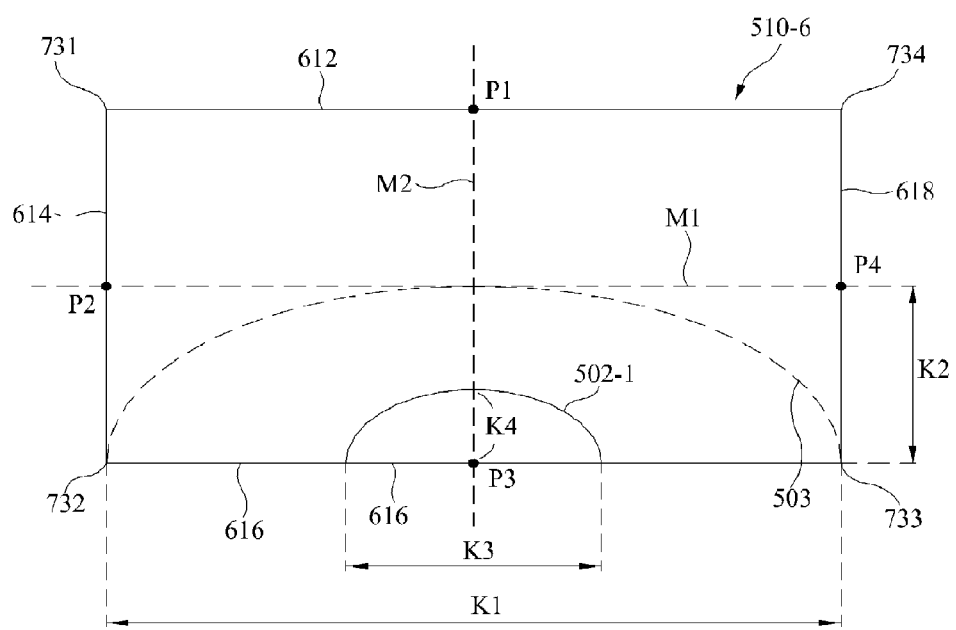
FIG. 21 is a plan view schematically illustrating a light guide plate with a light incidence portion according to another embodiment.

FIG. 21 illustrates a light guide plate 510-6 including a light incidence portion 502-1 according to another embodiment of the present disclosure. Referring to FIG. 21, the light guide plate 510-6 may include first to fourth side surfaces 612, 614, 616, and 618, and one or more concave light incidence portions 502-1 respectively provided at one or more of the first to fourth side surfaces 612, 614, 616, and 618. In the illustrated case, one concave light incidence portion 502-1 is provided at the third side surface 616.

The second and fourth side surfaces 614 and 618 are disposed at both ends of the third side surface 616. When a virtual line is drawn to extend from a corner 732, at which the third side surface 616 and the second side surface 614 meet, to a corner 733, at which the third side surface 616 and the fourth side surface 618 meet, while contacting a virtual line M1 connecting the centers P2 and P4 of the second and fourth side surfaces 614 and 618, the concave light incidence portion 502-1 may have a shape substantially identical to a reduced scale of the virtual line 503.

In detail, the light incidence portion 502-1 may be a curved surface having the same profile as a curved surface defined by the virtual line 503. Hereinafter, the curved surface defined by the virtual line 503 will be referred to as a "first curved surface 503". Of course, the light incidence portion 502-1 may have a shape corresponding to a reduced scale of the first curved surface 503.

The light guide plate 510-6 may include four corners 731 to 734. In this case, the first curved surface 503 may be a curved surface meeting the corners 732 and 733 of the light guide plate 510-6 adjacent to the side surface 616, at which the light incidence portion 502-1 is provided, while contacting the virtual line M1, namely, a first virtual line. The first curved surface 503 may be symmetrical with respect to a second reference line M2. Here, the first reference line M1 may be a line connecting centers P2 and P4 of the facing second and fourth side surfaces 614 and 618, and the second reference line M2 may be a line connecting centers P1 and P3 of the facing first and third side surfaces 612 and 616.

For example, the first curved surface 503 may have an oval shape contacting the first reference line M1. In this case, the center of the first curved surface 503 may correspond to the center P3 of the side surface 616 at which the light incidence portion 502-1 is provided. The longer-axis length of the first curved surface 503 may correspond to the length K1 of the side surface 616, at which the light incidence portion 502-1 is provided, and the shorter-axis length of the first curved surface 503 may correspond to the length K2 from the center P3 of the first curved surface 503 to the first reference line M1.

The curved surface of the light incidence portion 502-1 may have the same curvature as the first curved surface 503. The ratio between the longer-axis length K3 of the light incidence portion 502-1 and the longer-axis length K1 of the first curved surface 503 may be equal to the ratio between the shorter-axis length K4 of the light incidence portion 502-1 and the shorter-axis length K2 of the first curved surface 503.

Figure 22:
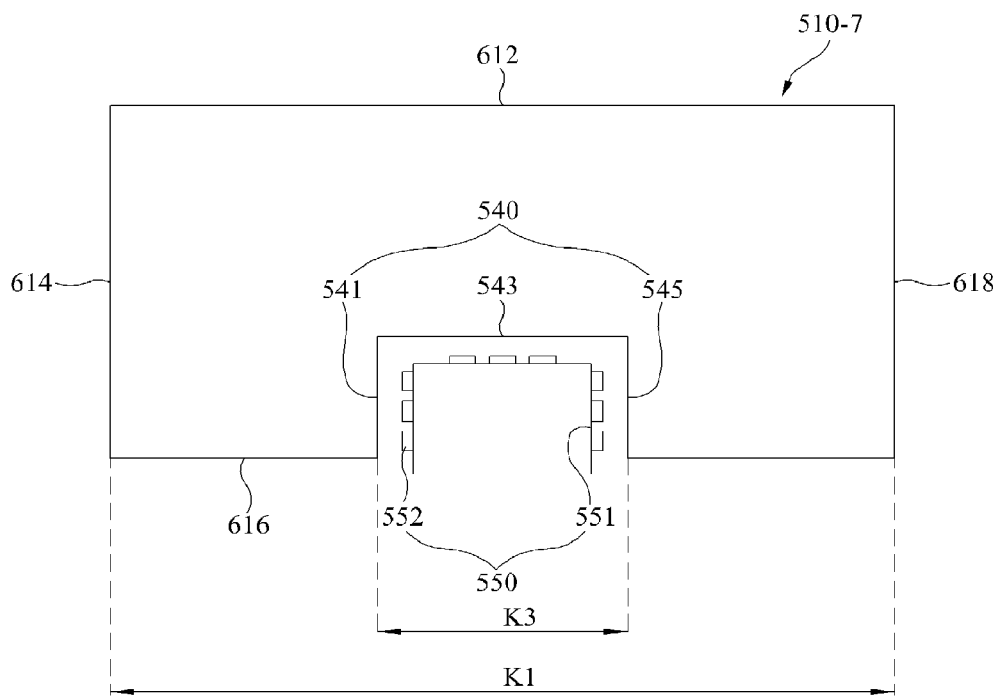
FIG. 22 is a plan view schematically illustrating a light guide plate with a light incidence portion according to another embodiment.

FIG. 22 illustrates a light guide plate 510-7 including a light incidence portion 540 according to another embodiment of the present disclosure. Referring to FIG. 22, the light incidence portion 540 of the light guide plate 510-7 has a polygonal shape. The light incidence portion 540 includes a plurality of light incidence surfaces. The angle defined between adjacent ones of the light incidence surfaces may be an acute angle. For example, the light incidence portion 540 includes three light incidence surfaces 541, 543, and 545. The second light incidence surface 543 is parallel to a side surface 616 of the light guide plate 510-7. The first and third light incidence surfaces 541 and 545 may be perpendicular to the second light incidence surface 543.

A light emitting module 550 is disposed to face the light incidence portion 540. The light emitting module 550 includes a circuit board 551 and light emitting diodes 552. The circuit board 551 may be bent to have portions respectively facing the first to third light incidence surfaces 541, 543, and 545. The light emitting diodes 552 may be disposed on the portions of the circuit board 551 to face the first to third light incidence surfaces 541, 543, and 545.

Figure 23:
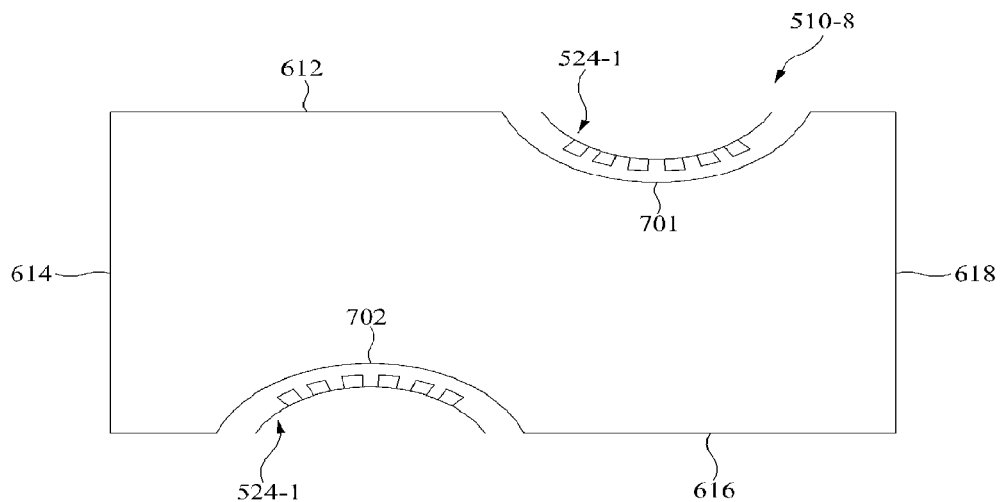
FIG. 23 is a plan view schematically illustrating a light guide plate with a light incidence portion according to another embodiment.

FIG. 23 illustrates a light guide plate 510-8 including light incidence portions according to another embodiment of the present disclosure. Referring to FIG. 23, the light guide plate 510-8 includes light incidence portions 701 and 702, which are concave curved surfaces formed at portions of two facing side surfaces 612 and 616 of the light guide plate 510-8, respectively.

The first light incidence portion 701 provided at the first side surface 612 is misaligned with the second light incidence portion 702 provided at the third side surface 616. For example, the first light incidence portion 701 may be misaligned with the second light incidence portion 702 in a direction from the first side surface 612 to the third surface 616.

Figure 24:
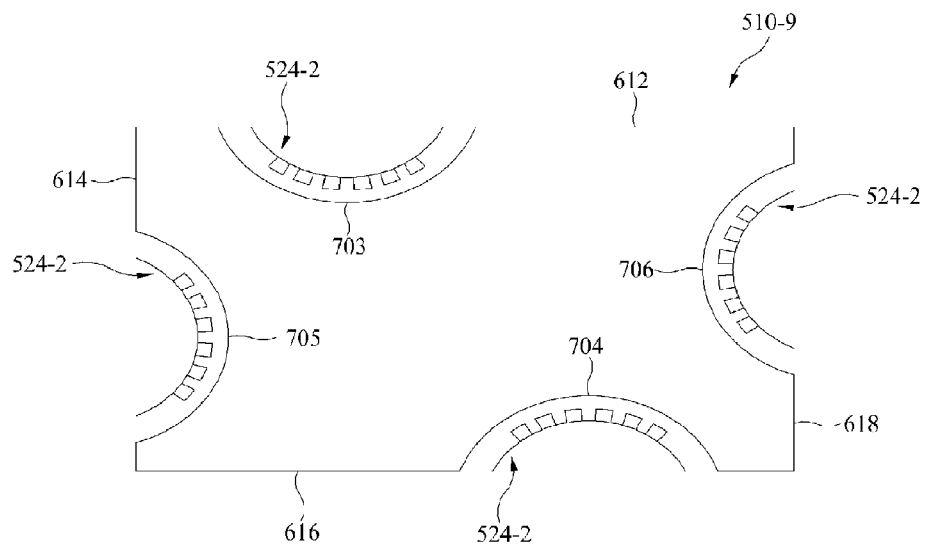
FIG. 24 is a plan view schematically illustrating a light guide plate with a light incidence portion according to another embodiment.

FIG. 24 illustrates a light guide plate 510-9 including light incidence portions according to another embodiment of the present disclosure. Referring to FIG. 24, the light guide plate 510-9 includes light incidence portions 703, 704, 705, and 706, which are concave curved surfaces formed at portions of four side surfaces 612, 616, 614, and 618 of the light guide plate 510-8, respectively. In this case, the light incidence portions 703 and 704 provided at the facing side surfaces 612 and 616 are misaligned with each other, and the light incidence portions 705 and 706 provided at the facing side surfaces 614 and 618 are misaligned with each other.

For example, the first light incidence portion 703 may be misaligned with the second light incidence portion 704 in a direction from the first side surface 612 to the third surface 616. Also, the third light incidence portion 705 may be misaligned with the fourth light incidence portion 706 in a direction from the second side surface 614 to the fourth surface 618.

Figure 25:
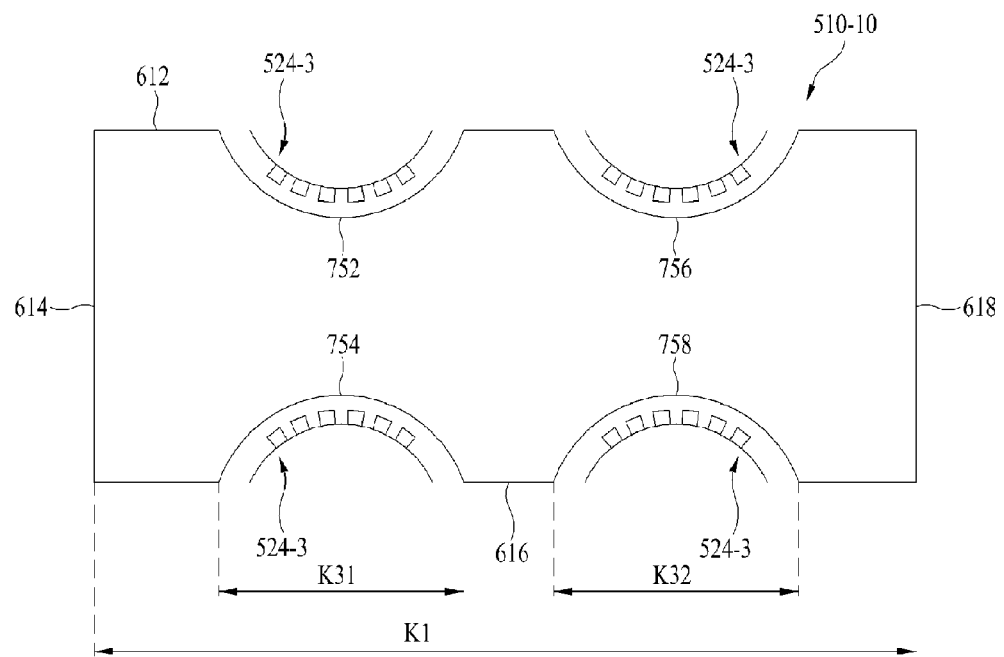
FIG. 25 is a plan view schematically illustrating a light guide plate with a light incidence portion according to another embodiment.

FIG. 25 illustrates a light guide plate 510-10 including light incidence portions according to another embodiment of the present disclosure. Referring to FIG. 25, the light guide plate 510-10 may include two or more light incidence portions provided at one surface of the light guide plate 510-10. For example, first and second light incidence portions 752 and 756 may be provided at a first side surface 612 of the light guide plate 510-10.

Alternatively, two or more light incidence portions may be provided at each of two facing side surfaces of the light guide plate 510-10. For example, third and fourth light incidence portions 754 and 758 may be provided at a second side surface 616 of the light guide plate 510-10, in addition to the first and second light incidence portions 752 and 756 provided at the first side surface 612 facing the second side surface 616.

In this case, the light incidence portions 752 and 756 of the side surface 612 may be aligned with the light incidence portions 754 and 758 of the side surface 616 facing the side surface 612. For example, the first incidence portion 752 may be aligned with the third light incidence portion 754, and the second incidence portion 756 may be aligned with the fourth light incidence portion 758.

Figure 26:
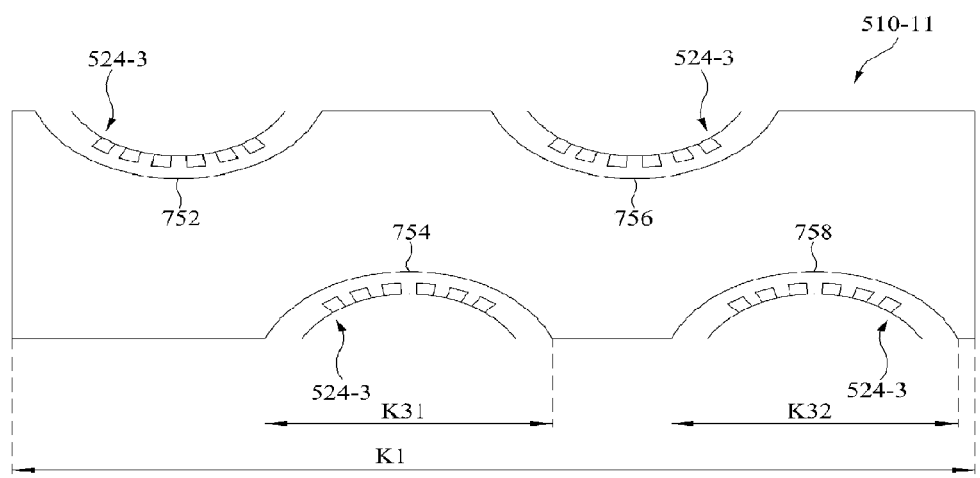
FIG. 26 is a plan view schematically illustrating a light guide plate with a light incidence portion according to another embodiment.

FIG. 26 illustrates a light guide plate 510-11 including light incidence portions according to another embodiment of the present disclosure. Referring to FIG. 26, the light guide plate 510-11 may include two or more light incidence portions 752, 754, 756, and 758 provided at each of two facing side surfaces 612 and 616 of the light guide plate 510-10 while being arranged in a misaligned manner.

Figure 27:
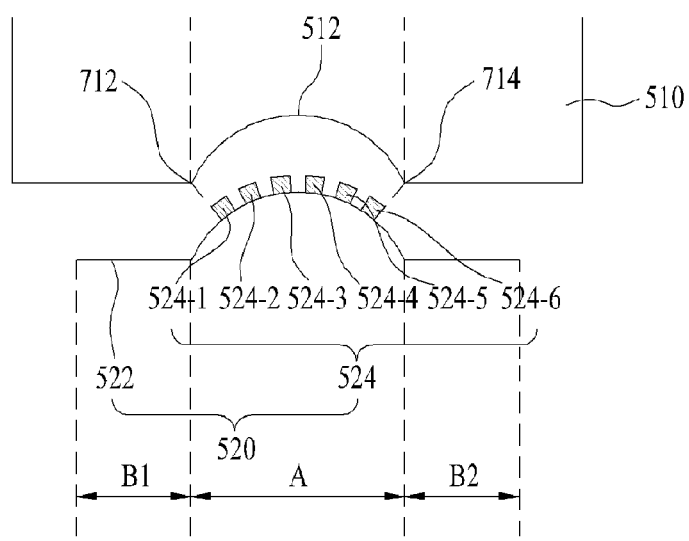
FIG. 27 is a plan view schematically illustrating a light emitting module arranged to face the light incidence portion shown in FIG. 14.

FIG. 27 illustrates a light emitting module 520 arranged to face the light incidence portion 512 shown in FIG. 14.

The light emitting module 520 is disposed inside the bottom cover 505 to face the light incidence portion 512 of the light guide plate 510, in order to irradiate light to the light incidence portion 512. The light emitting module 520 includes a circuit board 522 and light sources 524. The light sources 524 may be light emitting diodes, even through the present disclosure is not limited thereto.

The light emitting diodes 524 may be mounted on the circuit board 522 to face the light incidence portion 512, which is a concave curved surface. The circuit board 522 may be a flexible printed circuit board. For example, the circuit board 522 may be a board formed by cladding copper over a polyester or polyimide film.

The circuit board 522 may be bent to have a curved portion corresponding to the light incidence portion 512. For example, the circuit board 522 may have a curved portion having the same curvature as the light incidence portion 512. The light emitting diodes 524 may be disposed on the curved portion of the circuit board 522 to face the light incidence portion 512.

Referring to FIG. 27, the light emitting diodes 524, namely, light emitting diodes 524-1 to 524-6, disposed on the curved portion of the circuit board 522, namely, a curved portion A, may vary respective light emission directions thereof in accordance with the curvature of the curved portion A.

The curvature of the curved portion A may be adjusted to enable the entirety of the light emitting diodes 524 disposed on the curved portion A to irradiate light to the light incidence portion 512. For example, the curved portion A of the circuit board 522 has the same curvature as the light incidence portion 512.

The both ends of the light emitting diodes mounted on the curved portion A of the circuit board 522 (for example, 524-1 and 524-6) may be arranged to be directed to regions of the light incidence portion 512 inside both ends 712 and 714 of the light incidence portion 512, respectively, or to be aligned with the both ends 712 and 714 of the light incidence portion 512, respectively. In the embodiment of FIG. 27, the light emitting diodes 524 are disposed only on the curved portion A, although the present disclosure is not limited thereto. In another embodiment, the light emitting diodes may also be disposed on flat portions B1 and B2 of the circuit board 522.

The circuit board 522 may be divided into the curved portion A and the flat portions B1 and B2 arranged at both sides of the curved portion A. At least one of the curved portion A and flat portions B1 and B2 of the circuit board 522 may be fixed to one side surface of the bottom cover 201 while closely contacting the side surface of the bottom cover 201.

Referring to FIGS. 14 and 27, the bottom cover 505 arranged at the back surface of the light guide plate 510 may be provided, at one side surface thereof, with a curved portion 530 corresponding to the curved portion A of the circuit board 522

In the case wherein the curved portion 530 corresponding to the curved portion A is provided at one side surface of the bottom cover 505, the curved portion A of the circuit board 522 may be arranged between the light incidence portion 512 of the light guide plate 510 and the curved portion 530 of the bottom cover 505.

For example, the curved portion 530, which is provided at one side surface of the bottom cover 201, may have the same curvature as the curved portion A. The curved portion A of the circuit board 522 may closely contact the curved portion 530, and the flat portions B1 and B2 of the circuit board 522 may closely contact side surface portions of the bottom cover 505 adjacent to the curved portion 530. Also, the circuit board 522 may be fixed to one side surface of the bottom cover 201, using, for example, a double-sided tape or adhesive.

The light emitting diodes 524 disposed on the circuit board 522 may be white light emitting diodes to emit white light. A combination of red, green, and blue light emitting diodes may be arranged on the circuit board 522. For example, red light emitting diodes 524-1 and 524-4, green light emitting diodes 524-2 and 524-5, and blue light emitting diodes 524-3 and 524-6 may be alternately arranged on the circuit board 522.

The embodiment illustrated in FIG. 14 has a structural feature in that a light incidence portion 512 is arranged at a portion of at least one side surface of the light guide plate 510. Since a light emitting module 520 is arranged to face the light incidence portion 512, it may be possible to reduce the number of light sources, as compared to the case in which light emitting modules are arranged at all side surfaces of the light guide plate, respectively. It may also be possible to achieve uniform incidence of light upon the light guide plate 510 given that the light incidence portion 512 has a curved surface and is arranged at a central portion of the corresponding side surface of the light guide plate 510.

Figure 28:
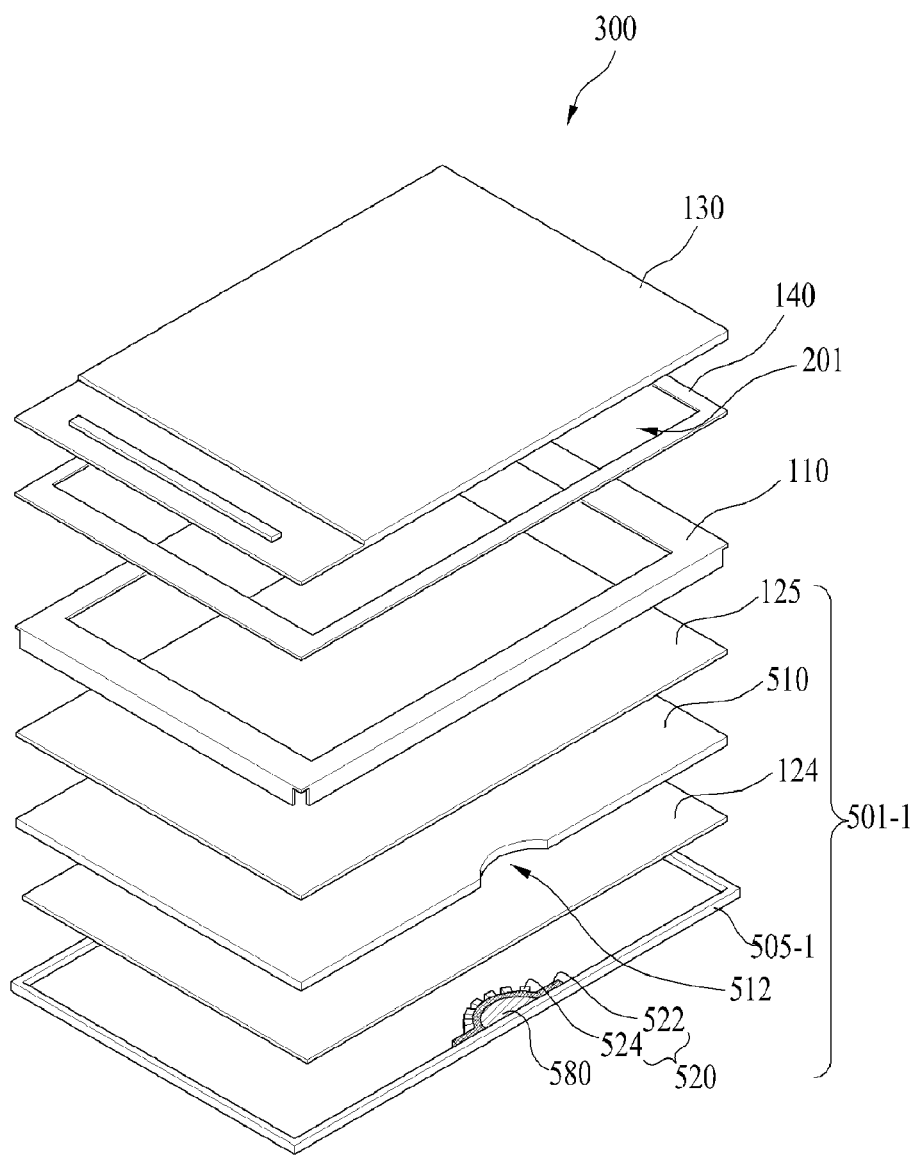
FIG. 28 is an exploded perspective view illustrating a display device according to another embodiment of the present disclosure.

FIG. 28 illustrates a display device 300 according to another embodiment of the present disclosure. In FIG. 28, the same constituent elements as those of FIG. 14 will be designated by the same reference numerals, respectively. No description will be given as to the same constituent elements in order to avoid repeated description.

Referring to FIG. 28, the display device 300 includes a top cover 110, a backlight unit 501-1, a liquid crystal display panel 130, and a light-shielding tape 140.

The backlight unit 501-1 includes a bottom cover 505-1, a light guide plate 510, a light emitting module 520, an optical sheet 125, a reflective sheet 124, and a heat sink 580.

The heat sink 580 is disposed inside the bottom cover 505-1 to correspond to a light incidence portion 512 of the light guide plate 510. For example, a portion of the heat sink 580 facing the light incidence portion 512 may have a curved surface having the same curvature as the light incidence portion 512.

The light emitting module 520 may be disposed between the light incidence portion 512 of the light guide plate 510 and the heat sink 580. The light emitting module 520 may include a circuit board 522 and light emitting diodes 524.

The circuit board 522 may be disposed between the light incidence portion 512 and the heat sink 580. The circuit board 522 may be bent to have a curved portion corresponding to the light incidence portion 512. The light emitting diodes 524 may be disposed on the curved portion of the circuit board 522. The heat sink 580 may dissipate heat generated from the light emitting diodes 524 or may transfer the heat to the bottom cover 505-1 to allow the heat to be dissipated from the bottom cover 505-1.

Figure 29:
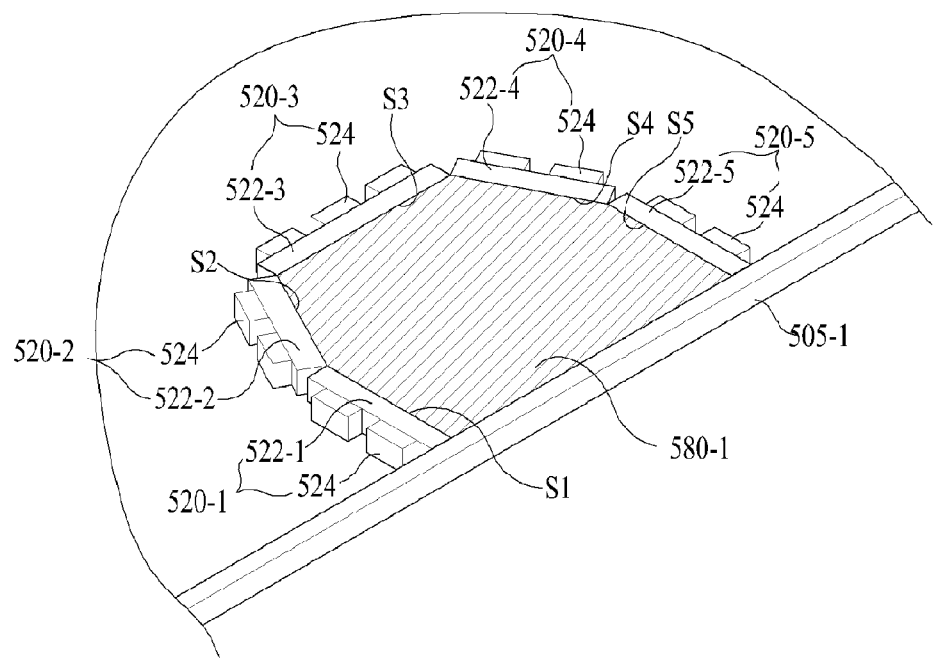
FIG. 29 is a perspective view illustrating a heat sink according to another embodiment of the present disclosure.

FIG. 29 illustrates a heat sink 580-1 according to another embodiment of the present disclosure. Referring to FIG. 29, the heat sink 580-1 may include a plurality of surfaces S1 to S5 facing the light incidence portion 512. The angle defined between adjacent ones of the surfaces S1 to S5 may be an obtuse angle. Light emitting modules 520-1 to 520-5 may be disposed on respective surfaces S1 to S5 of the heat sink 580-1 to face the light incidence portion 512.

For example, a first circuit board 522-1 may be disposed on the first surface S1 of the heat sink 580-1. First light emitting diodes 524 may be disposed on the first circuit board 522-1.

Figure 30:
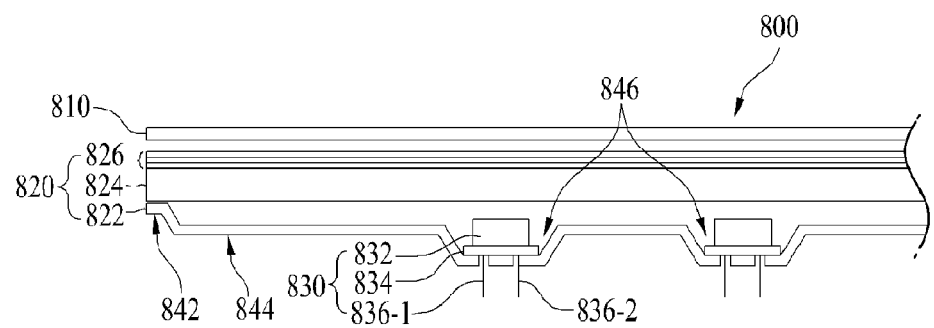
FIG. 30 is a sectional view illustrating a display device according to another embodiment of the present disclosure.

FIG. 30 illustrates a display device 300 according to another embodiment of the present disclosure. Referring to FIG. 30, the display device 800 includes a liquid crystal display panel 810 and a backlight unit 820.

The backlight unit 820 includes a bottom cover 822, a diffusion plate 824, an optical sheet 826, and one or more light emitting modules 830.

The diffusion plate 824 is disposed on a front surface (or an upper surface) of the bottom cover 822. The optical sheet 826 is disposed on a front surface (or an upper surface) of the diffusion plate 824. That is, the diffusion plate 824 is arranged beneath the optical sheet 826, and the bottom cover 822 is arranged beneath the diffusion plate 824.

The light emitting modules 830 are disposed between the bottom cover 822 and the diffusion plate 824, to irradiate light toward the diffusion plate 824. The backlight unit 820 shown in FIG. 30 is of a direct lighting type wherein the light emitting modules 830 are arranged to directly irradiate light to the liquid crystal display panel 810.

The bottom cover 822 accommodates the light emitting modules 830, diffusion plate 824, and optical sheet 826. The bottom cover 822 may be made of a metal such as aluminum, zinc, copper, iron, stainless steel, or an alloy thereof.

The bottom cover 822 includes one or more concave portions 846 facing the diffusion plate 824. The one or more light emitting modules 830 are disposed at the one or more concave portions 846, respectively. Each concave portion 846 may be a line-shaped or trench-shaped groove extending in a side direction of the bottom cover 822.

In addition to the concave portions 846, the bottom cover 922 includes a support portion 842 and a bottom portion 844. The support portion 842, which is an edge portion of the bottom cover 822, may support an edge portion of the diffusion plate 824. The bottom portion 844 faces the diffusion plate 824. The one or more concave portions 846 are provided at the bottom portion 844.

The support portion 842 is stepped from the bottom portion 844 to form an air gap between the light emitting module 830 disposed at each concave portion 846 and the diffusion plate 824. For example, the support portion 842 may contact an edge portion of the back surface of the diffusion plate 824, and the bottom portion 844 may be spaced apart from the back surface of the diffusion plate 824.

In this case, the distance between the back surface of the diffusion plate 824 and the bottom portion 844 may be greater than the distance between the back surface of the diffusion plate 824 and the support portion 842. Also, the distance between the back surface of the diffusion plate 824 and each concave portion 846, at which one light emitting module 830 is disposed, may be greater than the distance between the back surface of the diffusion plate 824 and the bottom portion 844.

That is, the bottom cover 822 is bent in a direction opposite to the diffusion plate 824 at a region where the support portion 842 and the bottom portion 844 are connected. The bottom cover 822 is again bent in the direction opposite to the diffusion plate 824 at a region where each concave portion 846 is connected to the bottom portion 844. The direction opposite to the diffusion plate 824 may be identical to the direction from the diffusion plate 824 toward the bottom cover 822.

Each light emitting module 830 includes a circuit board 834, light sources 832, and one or more electrode terminals, for example, two electrode terminals 836-1 and 836-2. Each light source 832 may be a light emitting diode (LED) package, although the present disclosure is not limited thereto. For example, each light emitting module 830 may include the circuit board 834 and LED packages mounted on the circuit board 834.

The circuit board 834 is disposed to contact the bottom of the corresponding concave portion 846. The top surface of each LED package disposed on the circuit board 834 may be flush with or lower than the bottom portion 844. The distance between the diffusion plate 824 and the bottom portion 844, namely, a first distance, may be equal to the distance between the diffusion plate 824 and the top surface of each LED package disposed at each concave portion 846, namely, a second distance. Alternatively, the second distance may be greater than the first distance.

Each of the electrode terminals, for example, the first and second electrode terminals 836-1 and 836-2, is electrically connected, at one end thereof, to the corresponding circuit board 834, in order to supply a positive (+) or negative (−) voltage to the circuit board 834. The other end of each of the first and second electrode terminals 836-1 and 836-2 extends through the bottom of the corresponding concave portion 846 so as to be exposed to the outside of the bottom cover 822. A positive (+) voltage may be supplied to the first electrode terminal 836-1 exposed to the outside of the bottom cover 822, and a negative (−) voltage may be supplied to the second electrode terminal 836-2 exposed to the outside of the bottom cover 822.

For example, each concave portion 846 of the bottom cover 822 has through holes (not shown). The first and second terminals 836-1 and 836-2 may extend through the through holes of the corresponding concave portion 846 so as to be exposed to the outside of the bottom cover 822.

The optical sheet 826 may include at least one of a prism sheet, an optical diffusion sheet, an optical reflective film, a polarizing film, a reflective polarizing film, a phase difference film, and an electromagnetic shielding film, although the present disclosure is not limited thereto. The liquid crystal display panel 810 is disposed in front of or above the optical sheet 826.

Figure 31:
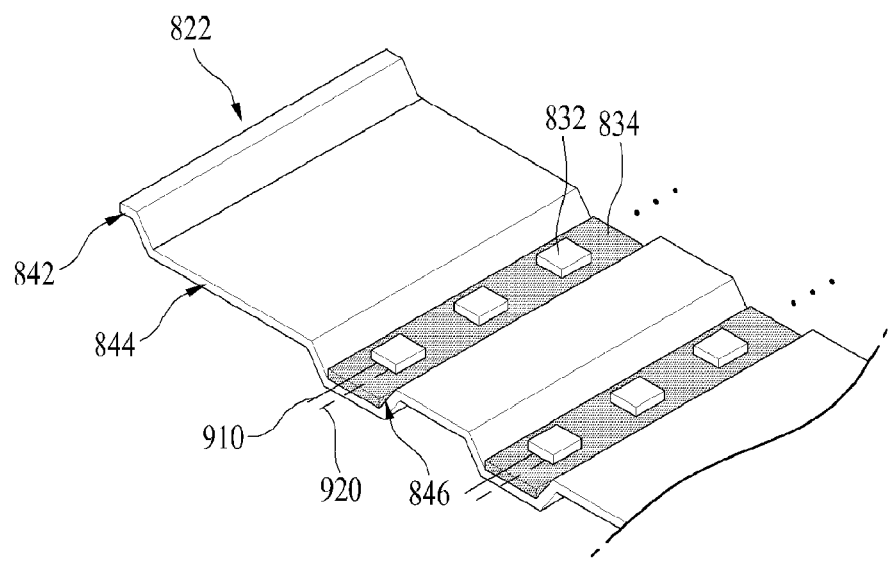
FIG. 31 is a perspective view illustrating an exemplary embodiment of each light emitting module disposed on a bottom cover shown in FIG. 30.

FIG. 31 illustrates an exemplary embodiment of each light emitting module disposed on the bottom cover 822 shown in FIG. 30. In FIG. 31, the same constituent elements as those of FIG. 30 will be designated by the same reference numerals, respectively. No description will be given as to the same constituent elements in order to avoid repeated description.

Referring to FIG. 31, a bar-shaped circuit board 834 may be disposed on the bottom of each line-shaped concave portion 846. LED packages 832 may be disposed on the circuit board 834 while being spaced apart from one another. For example, the embodiment of FIG. 31 may have an arrangement wherein one circuit board 834 is disposed on the bottom of each concave portion 846, and a plurality of LED packages are disposed on the circuit board 834.

First and second electrode terminals 910 and 920, which will electrically contact the circuit board 834, are arranged at one lateral end of each concave portion 826. Connectors (not shown) may also be provided to be electrically connected to the first and second electrode terminals 910 and 920 connected to the corresponding circuit board 834, respectively. The connectors (not shown) may be electrically connected to each LED package 832 via a wiring (not shown) provided at the circuit board 834.

In the embodiment of FIG. 31, the first and second electrode terminals 910 and 920 connected to the circuit board 834 may extend in a side direction of the bottom cover 822, for example, a direction parallel to the bottom cover 822, without extending through the bottom of the corresponding concave portion 846, different from the embodiment of FIG. 30.

In the embodiments of FIGS. 30 and 31, concave portions 846 are provided at the bottom cover 822, and light emitting modules 830 are disposed at respective concave portions 846 so that a bar-shaped circuit board 834 of each light emitting module 830 is disposed on each concave portion 846. Accordingly, it may be possible to reduce the air gap defined between the diffusion plate 824 and the bottom cover 822, and thus to allow the backlight unit and the display device to have a slim structure.

Figure 32:
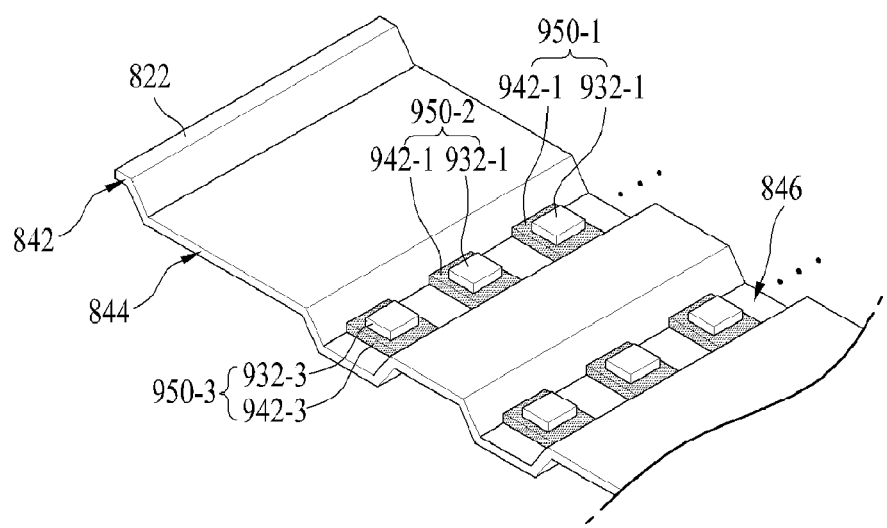
FIG. 32 is a perspective view illustrating another embodiment of each light emitting module disposed on the bottom cover shown in FIG. 30.

FIG. 32 illustrates another embodiment of each light emitting module disposed on the bottom cover 822 shown in FIG. 30. In FIG. 32, the same constituent elements as those of FIG. 30 will be designated by the same reference numerals, respectively. No description will be given as to the same constituent elements in order to avoid repeated description. Referring to FIG. 32, individual and independent light emitting modules 950-1 to 950-3 are disposed on the bottom of at least one concave portion 846 while being spaced apart from one another.

Each of the light emitting modules 950-1 to 950-3 includes a circuit board 94201, 942-2 or 942-3, and a light source 932-1, 932-2 or 932-3.

Each light emitting module 950-1, 950-2 or 950-3 is electrically connected to a first electrode terminal (see "836-1" in FIG. 30) and a second electrode terminal (see "836-2" in FIG. 30). The first and second electrode terminals extend through the bottom of the concave portion 846 so as to be exposed to the outside of the bottom cover 822. The first and second electrode terminals connected to each of the light emitting modules 950-1 to 950-3 may have the same shape as the first and second electrode terminals 836-1 and 836-2.

For example, the bottom cover 822 may include at least one line-shaped concave portion 846, and a plurality of circuit boards 942-1 to 942-3 may be disposed on the bottom of the concave portion 846 while being spaced apart from one another. Also, LED packages 942-1, 942-2, and 942-3 may be mounted on the circuit boards 942-1 to 942-3, respectively.

Two through holes (not shown) are formed through the bottom of the concave portion 846 at a region corresponding to each of the circuit boards 942-1 to 942-3. Each of the first and second electrode terminals corresponding to one of the circuit boards 942-1 to 942-3 is connected, at one end thereof, to the corresponding circuit board. The other ends of the first and second electrode terminals extend through the corresponding two through holes so as to be exposed to the outside of the bottom cover 822.

Accordingly, the first and second electrode terminals electrically connected to each of the light emitting modules 950-1 to 950-3 may be individual and independent of those of the remaining light emitting modules. Thus, it may be possible to independently control each of the light emitting modules 950-1 to 950-3.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A backlight unit comprising:
a light guide plate including a light emitting portion to emit light, side surfaces defining corners, and a first light incidence portion and a second light incidence portion to receive light;
at least two light emitting modules respectively disposed to face the first light incidence portion and the second light incidence portion; and
an optical sheet disposed on the light guide plate,
wherein the first light incidence portion is disposed one corner region of the light guide plate, and the second light incidence portion is disposed another corner region of the light guide plate,
wherein the first light incidence portion is facing the second light incidence portion or disposed to both sides of one side surface of the light guide plate, and
wherein at least one of the light emitting modules comprises:
a circuit board; and
a plurality of light emitting devices spaced from each other on the circuit board and arranged in one plane.

2. The backlight unit according to claim 1, wherein the first light incidence portion and the second light incidence portion are surfaces formed by cutting out at least two of the corners of the light guide plate, and
wherein the cut-out surfaces have a part of a shape selected from a circular shape, an oval shape, and a polygonal shape.

3. The backlight unit according to claim 1, wherein the first light incidence portion and the second light incidence portion are disposed to both ends of one side surface of the light guide plate.

4. The backlight unit according to claim 1, wherein the light emitting modules include three or more light emitting modules,
wherein at least one of the light emitting modules is arranged to face the side surfaces of the light guide plate and is connected with one of the first light incidence portion and the second light incidence portion.

5. The backlight unit according to claim 1, wherein at least one of the first light incidence portion and the second light incidence portion has a roughness at a surface thereof.

6. The backlight unit according to claim 1, wherein at least one of the first light incidence portion and the second light incidence portion comprises a first curved surface, and
wherein the circuit board comprises a second curved surface corresponding to the first curved surface.

7. A backlight unit comprising:
a light guide plate including light incidence portions having a curved surface type or a polygonal surface type formed at least one side surface of the light guide plate,
wherein the light guide plate comprises first to fourth surfaces and the light incidence portion is disposed on at least one of the first to fourth surfaces;
a light emitting module disposed to face the light incidence portion; and
an optical sheet disposed on the light guide plate,
wherein the light emitting modules comprise:
a circuit board arranged to face an associated one of the light incidence portions, the circuit board having a curved or bent portion corresponding to the associated light incidence portion; and
light emitting elements disposed on the circuit board to face the associated light incidence portion.

8. The backlight unit according to claim 7, wherein the light incidence portion is respectively two side surface of the light guide plate.

9. The backlight unit according to claim 7, wherein the light guide plate includes at least two light incidence portions at one of the first to fourth surfaces.

10. The backlight unit according to claim 7, wherein the light guide plate includes at least one light incidence portion at each of facing ones of the first to fourth surfaces.

11. The backlight unit according to claim 10, wherein the light incidence portions of the facing ones of the first to fourth surfaces are aligned with each other in a symmetrical manner.

12. The backlight unit according to claim 10, wherein the light incidence portions of the facing ones of the first to fourth surfaces are misaligned with each other.

13. The backlight unit according to claim 7, wherein a ratio of a length of the light incidence portions to an entire length of the surface of the light guide plate is equal to or less than $\frac{1}{3}$.

14. The backlight unit according to claim 7, further comprising:
a bottom cover disposed at a back surface of the light guide plate,
wherein the bottom cover has one or more portions having a shape corresponding to the light incidence portions at least one side surface of the bottom cover, and each of the light emitting modules is arranged between a corresponding one of the light incidence portions and the bottom cover.

15. The backlight unit according to claim 7, further comprising:
a bottom cover disposed at a back surface of the light guide plate; and
one or more heat sinks disposed in the bottom cover to correspond to the light incidence portions, respectively,
wherein each of the light emitting modules is arranged between a corresponding one of the light incidence portions and a corresponding one of the heat sink.

16. The backlight unit according to claim 7, wherein the circuit board is a flexible printed circuit board.

17. A backlight unit comprising:
a light guide plate including first to fourth side surfaces and a concave light incidence portion formed at least one of the side surfaces; and
a light emitting module disposed to face the light incidence portion,
wherein the second and fourth side surfaces are disposed at both ends of the first side surface,
wherein the light incidence portion has a shape substantially identical to a reduced scale of a virtual line drawn to extend from a corner, at which the first and second side surfaces meet, to a corner, at which the first and fourth surfaces meet, while contacting a virtual line connecting centers of the second and fourth side surfaces, and
wherein the light emitting module comprises:
a circuit board arranged to face the light incidence portion, the circuit board having a curved or bent portion corresponding to the light incidence portion; and
light emitting elements disposed on the circuit board to face the light incidence portion.

18. The backlight unit according to claim 17, wherein a ratio between a longer-axis length of the light incidence portion and a longer-axis length of the virtual curve is equal to a ratio between a shorter-axis length of the light incidence portion and a shorter-axis length of the virtual curve.

* * * * *